United States Patent [19]
Gotoh et al.

[11] Patent Number: 6,098,061
[45] Date of Patent: *Aug. 1, 2000

[54] COMPUTER SYSTEM FOR INTERACTIVE HELP USING HUMAN-UNDERSTANDABLE KNOWLEDGE AND COMPUTER-UNDERSTANDABLE KNOWLEDGE

[75] Inventors: Kazuyuki Gotoh, Kawasaki; Hideo Numagami, Yokohama; Yoichi Takebayashi, Kamakura; Kouichi Sasaki, Kawasaki, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/816,972

[22] Filed: Mar. 13, 1997

[30] Foreign Application Priority Data

Mar. 14, 1996 [JP] Japan .................................. 8-057644

[51] Int. Cl.⁷ ...................................................... G06N 5/00
[52] U.S. Cl. ................................ 706/50; 706/11; 706/45; 706/58
[58] Field of Search .......................... 395/183.02; 705/1; 706/11, 45, 58, 50; 707/50

[56] References Cited

U.S. PATENT DOCUMENTS

| | | | |
|---|---|---|---|
| 5,103,498 | 4/1992 | Lanier et al. ............................. | 706/58 |
| 5,107,499 | 4/1992 | Lirov et al. ......................... | 395/183.02 |
| 5,167,010 | 11/1992 | Elm et al. ................................. | 706/45 |
| 5,239,617 | 8/1993 | Gardner et al. ........................... | 706/11 |
| 5,255,386 | 10/1993 | Prager ........................................ | 707/5 |
| 5,301,320 | 4/1994 | McAtee et al. . | |
| 5,442,759 | 8/1995 | Chiang et al. .............................. | 705/1 |

OTHER PUBLICATIONS

Seki, et al., "Flexible Information Sharing and Handling System—Towards Knowledge Propagation", IEICE Trans. Comm., vol. E77–B, No. 3, Mar. 1994, pp. 404–410.

*Primary Examiner*—Tariq R. Hafiz
*Assistant Examiner*—Wilber L. Starks, Jr.
*Attorney, Agent, or Firm*—Oblon, Spivak, McClelland, Maier & Neustadt, P.C.

[57] ABSTRACT

A computer-understandable knowledge base for accumulating computer-understandable task knowledge and a know-how knowledge base for accumulating know-how knowledge understandable for a human being are provided. In accordance with, for example, a result of the process for solving a problem which has been performed by the computer-understandable knowledge base 1, know-how knowledge relating to the problem solution is automatically retrieved and presented. Since know-how knowledge relating to the problem solution is automatically retrieved and presented in accordance with the state of the problem solving process which has been performed by the computer-understandable knowledge base, a user is able to efficiently make a reference to required know-how knowledge without a complicated process for conditions for retrieving the know-how knowledge. Even if a problem cannot be solved by the computer-understandable knowledge base, the know-how knowledge is used to guide the problem solution.

18 Claims, 25 Drawing Sheets

NAME OF TASK    : PURCHASE
PERSON IN CHARGE : [PERSON IN CHARGE] ~22
DEADLINE        : [REQUIRED DAY]
MAIN-TASK       : NO TASK
SUB-TASK        : IF "10,000 YEN" ≦ [PRICE] < "200,000 YEN"
                  IF [CLASSIFICATION OF PRODUCT] = "PRODUCT OF THE COMPANY"
                  THEN "REQUEST FOR ARRANGEMENT" → "DECISION" → "ORDER" → "INSPECTION"
                  ELSE "REQUEST FOR ESTIMATION" → "APPROVAL OF REQUEST FOR ESTIMATION" →
                       "ESTIMATION" → "REQUEST FOR ARRANGEMENT" → "DECISION" → "ORDER" →
                       "INSPECTION"
                  ELSE IF [PRICE] < "10,000 YEN"
                  THEN "REQUEST FOR ORDER" → "ORDER" → "INSPECTION"                    ~23
PREVIOUS TASK   : NO TASK
NEXT TASK       : NO TASK
DOCUMENT        : NO DOCUMENT
NAME OF PRODUCT : [NAME OF PRODUCT]
CONSTRAINT      : "DEADLINE" ≧ "TODAY"  ~24

```
NAME OF TASK      : REQUEST FOR ESTIMATION
PERSON IN CHARGE  : [PERSON IN CHARGE]
DEADLINE          : "NEXT TASK" ~ "DEADLINE" - "ONE DAY"
MAIN-TASK         : PURCHASE
SUB-TASK          : NO TASK
PREVIOUS TASK     : NO TASK
NEXT TASK         : APPROVAL OF REQUEST FOR ESTIMATION
DOCUMENT          : NO DOCUMENT
CONSTRAINT        : "DEADLINE" ≧ "TODAY"
```

FIG. 2C

```
NAME OF TASK      : APPROVAL OF REQUEST FOR ESTIMATION
PERSON IN CHARGE  : [PERSON IN CHARGE]~MANAGER
DEADLINE          : "NEXT TASK" ~ "DEADLINE" - "ONE DAY"
MAIN-TASK         : PURCHASE
SUB-TASK          : NO TASK
PREVIOUS TASK     : REQUEST FOR ESTIMATION
NEXT TASK         : REQUEST FOR ARRANGEMENT
DOCUMENT          : DOCUMENT FOR ESTIMATION REQUEST
CONSTRAINT        : "DEADLINE" ≧ "TODAY"
```

FIG. 2D

```
NAME OF TASK      : ESTIMATION
PERSON IN CHARGE  : MATERIAL SECTION
DEADLINE          : "NEXT TASK" ~ "DEADLINE" - "TWO WEEKS"
MAIN-TASK         : PURCHASE
SUB-TASK          : NO TASK
PREVIOUS TASK     : APPROVAL OF REQUEST FOR ESTIMATION
NEXT TASK         : REQUEST FOR ARRANGEMENT
DOCUMENT          : DOCUMENT FOR ESTIMATION REQUEST
CONSTRAINT        : "DEADLINE" ≧ "TODAY"
```

FIG. 3A

```
NAME OF TASK    : REQUEST FOR ARRANGEMENT
PERSON IN CHARGE: [PERSON IN CHARGE]
DEADLINE        : "NEXT TASK" ~ "DEADLINE" - "ONE DAY"
MAIN-TASK       : PURCHASE
SUB-TASK        : NO TASK
PREVIOUS TASK   : ESTIMATION
NEXT TASK       : DECISION
DOCUMENT        : IF [PRICE] < "100,000 YEN"                                    31
                  THEN "DOCUMENT FOR REQUEST FOR ARRANGEMENT", "DOCUMENT FOR
                       ESTIMATION"
                  ELSE "DOCUMENT FOR REQUEST FOR ARRANGEMENT", "DOCUMENT FOR ESTIMATION",
                       "DOCUMENT INDICATING REASON"
CONSTRAINT      : "DEADLINE" ≧ "TODAY"
```

FIG. 3B

```
NAME OF TASK    : DECISION OF REQUEST FOR ARRANGEMENT
PERSON IN CHARGE: IF [PRICE] < "100,000 YEN"                          32
                  THEN [PERSON IN CHARGE] ~ MANAGER
                  ELSE [PERSON IN CHARGE] ~ GENERAL MANAGER
DEADLINE        : "NEXT TASK" ~ "DEADLINE" - "ONE DAY"
MAIN-TASK       : PURCHASE
SUB-TASK        : NO TASK
PREVIOUS TASK   : REQUEST FOR ARRANGEMENT
NEXT TASK       : ORDER
DOCUMENT        : "DOCUMENT FOR REQUEST FOR ARRANGEMENT", "DOCUMENT FOR ESTIMATION"
CONSTRAINT      : "DEADLINE" ≧ "TODAY"
```

```
NAME OF TASK    : ORDER
PERSON IN CHARGE: MATERIAL SECTION
DEADLINE        : "NEXT TASK" ~ "DEADLINE" - "TWO WEEKS"
MAIN-TASK       : PURCHASE
SUB-TASK        : NO TASK
PREVIOUS TASK   : DECISION
NEXT TASK       : INSPECTION
DOCUMENT        : DOCUMENT FOR DELIVERY
CONSTRAINT      : "DEADLINE" ≧ "TODAY"
```

FIG. 3C

```
NAME OF TASK    : INSPECTION
PERSON IN CHARGE: [PERSON IN CHARGE]
DEADLINE        : "MAIN-TASK" ~ "DEADLINE"
MAIN-TASK       : PURCHASE
SUB-TASK        : NO TASK
PREVIOUS TASK   : ORDER
NEXT TASK       : NO TASK
DOCUMENT        : NO DOCUMENT
CONSTRAINT      : "DEADLINE" ≧ "TODAY"
```

FIG. 3D

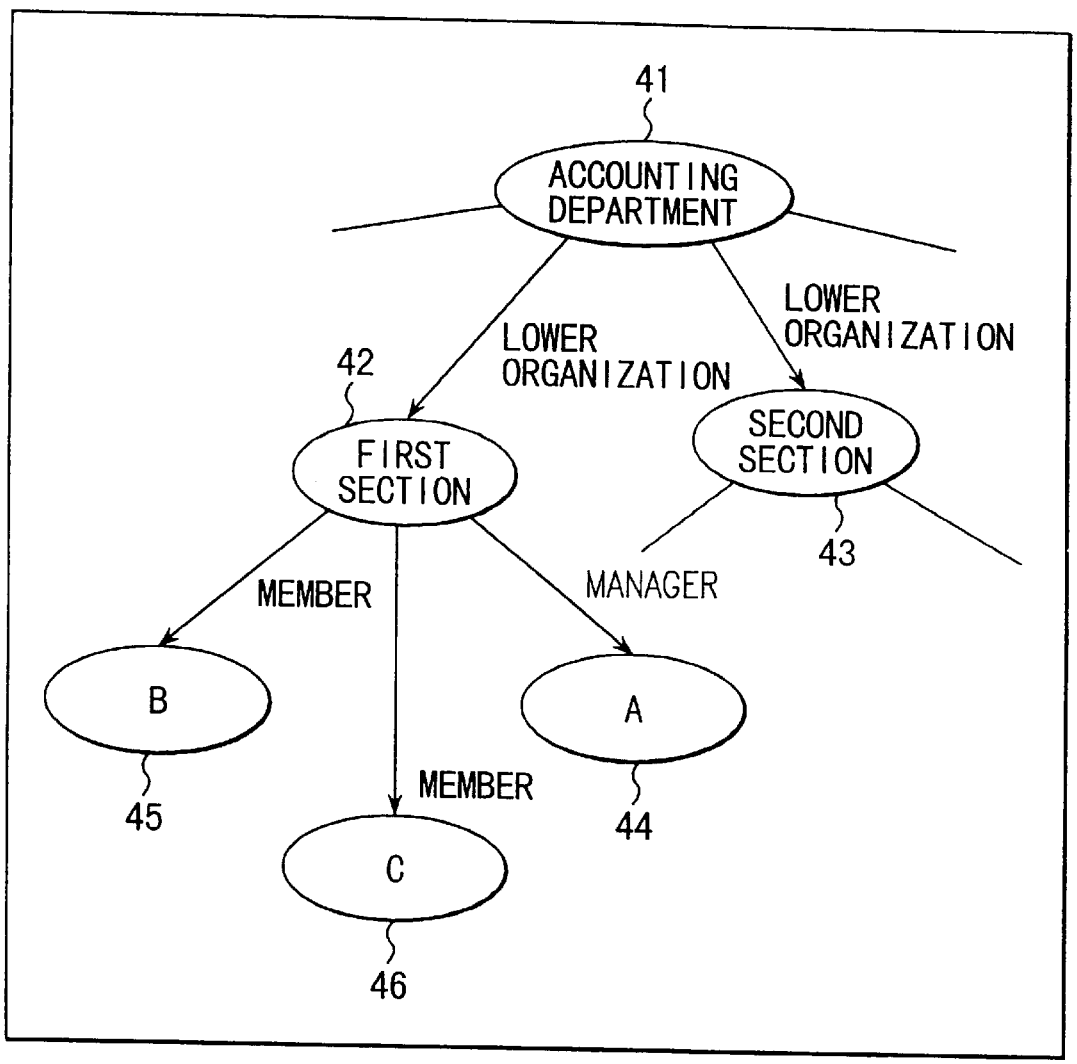
F I G. 4

| TITLE | : "PROCEDURE FOR PURCHASING ARTICLE, THE PRICE OF WHICH EXCEEDS 100,000 YEN" |
|---|---|
| WRITTEN BY | : D |
| DAY OF REGISTRATION | : AUGUST 18, 1996 |
| KEYWORD | : "PURCHASE" , "REQUEST FOR ARRANGEMENT" , "PRICE, 100,000 YEN" , "DOCUMENT" , "DOCUMENT INDICATING REASON FOR USE" |
| CONTENTS | : "IF THE PRICES OF THE ARTICLE REQUIRED TO BE PURCHASED EXCEEDS 100,000 YEN, DOCUMENTS REQUIRED WHEN THE ARRANGEMENT IS REQUESTED INCREASE. THAT IS, DOCUMENT INDICATING REASON FOR USE MUST BE ADDED TO EXPLAIN THE GENERAL MANAGER THE REASON WHY THE ARTICLE IS REQUIRED TO BE PURCHASED." |

FIG. 5A

| TITLE | : "PURCHASE OF PRODUCT, THE PRICE OF WHICH EXCEEDS 200,000 YEN" |
|---|---|
| WRITTEN BY | : D |
| DAY OF REGISTRATION | : JANUARY 15, 1997 |
| KEYWORD | : "PURCHASE" , "PRICE, 200,000 YEN" , "DIVISION" , "CLASSIFICATION OF PRODUCT" |
| CONTENTS | : "ANY ARTICLE, THE PRICE OF WHICH EXCEEDS 200,000 YEN, CANNOT BE PURCHASED BY A USUAL PURCHASING PROCEDURE. IF THE ARTICLE, REQUIRED TO BE PURCHASED, CAN BE DIVIDED INTO SECTIONS AND THE PRICE OF EACH OF WHICH DOES NOT EXCEED 200,000 YEN, ARRANGEMENT OF EACH SECTION ENABLES THE ARTICLE TO BE PURCHASED BY THE USUAL PROCEDURE." |

```
TITLE            : "PURCHASE OF PRODUCTION OF THE COMPANY"
WRITTEN BY       : E
DAY OF REGISTRATION : DECEMBER 24, 1995
KEYWORD          : "PRODUCT OF THE COMPANY", "PURCHASE", "ESTIMATION"
CONTENTS         : "WHEN PRODUCT OF THE COMPANY IS PURCHASED, THE DOCUMENT FOR
                   ESTIMATION IS NOT REQUIRED. THEREFORE, THE PROCESS MAY START
                   AT THE PROCEDURE OF THE REQUEST FOR ARRANGEMENT. FOR DETAILS,
                   MAKE AN INQUIRY TO THE MATERIAL SECTION."
```

FIG. 5D

```
TITLE            : "SHORTENING OF ESTIMATION PROCEDURE"
WRITTEN BY       : E
DAY OF REGISTRATION : APRIL 27, 1996
KEYWORD          : "PURCHASE", "ESTIMATION", "DATE OF DELIVERY", "REQUEST FOR
                   ESTIMATION",
CONTENTS         : "AS A COUNTERMEASURE AGAINST A PROBLEM IN THAT, FOR EXAMPLE,
                   THE ARICLE, REQUIRED TO BE PURCHASED, CANNOT BE INSPECTED
                   UNTIL THE REQUIRED DATE OF DELIVERY IF A FORMAL PROCEDURE IS
                   PERFORMED, A PROCESS MAY BE PERFORMED BY ADDING A TEMPORARY
                   DOCUMENT OF ESTIMATION TO DECREASE DAYS REQUIRED TO COMPLETE THE
                   PURCHASING TASK. HOWEVER, THE FORMAL PROCEDURE FOR REQUESTING
                   THE ESTIMATION MUST BE PERFORMED TO OBTAIN THE DOCUMENT OF
                   THE ESTIMATION AND SUBMIT THE SAME LATER."
```

| | |
|---|---|
| TITLE | : "QUICKENING OF THE PROCEDURE FOR THE REQUEST FOR ARRANGEMENT" |
| WRITTEN BY | : F |
| DAY OF REGISTRATION | : OCTOBER 2, 1996 |
| KEYWORD | : "DATE OF DELIVERY", "REQUEST FOR ARRANGEMENT", "PREVIOUS ARRANGEMENT", "DAY" |
| CONTENTS | : "IF THE ARTICLE IS REQUIRED TO BE OBTAINED QUICKLY, THE PERSON IS PERMITTED TO BRING THE DOCUMENT TO CONCERNED DEPARTMENTS IN TURN OR A REQUEST FOR THE ARRANGEMENT MAY PREVIOUSLY BE MADE TO THE TRADER TO COMPLETE THE PROCESS IN THE SUBSTANTIAL VOCHER PROCESS PERIOD. NOTE THAT THE FOREGOING PROCESS IS EMERGENCY MEASURES." |

INPUT OF NAME OF TASK

NAME OF TASK: PURCHASE

EXECUTE   CANCEL

FIG. 10A

PURCHASING TASK   INPUT PARAMETER

NAME OF ARTICLE         : COMMUNICATION MODEM
PRICE                   : 60,000 YEN
REQUIRED DATA OF DELIVERY: SEPTEMBER 17, 1996
PERSON IN CHARGE        : B
CLASSIFICATION OF PRODUCT: PRODUCT OF THE COMPANY

EXECUTE   CANCEL

101

F I G. 1 0 B

PURCHASING TASK    INPUT PARAMETER

NAME OF ARTICLE         : PERSONAL COMPUTER
PRICE                   : 360,000 YEN
REQUIRED DATA OF DELIVERY : OCTOBER 25, 1996
PERSON IN CHARGE        : G
CLASSIFICATION OF PRODUCT : PRODUCT OF THE COMPANY ( EXECUTE )   ( CANCEL )

102

PROCEDURE OF PURCHASING TASK      DATA OF THE DAY: AUGUST 20, 1996

| NAME OF TASK | PERSON IN CHARGE | DEADLINE |
|---|---|---|
| "PURCHASE" | B | SEPTEMBER 17, 1996 |
| "REQUEST FOR ESTIMATION" | B | AUGUST 16, 1996 |
| "ARRANGEMENT OF REQUEST FOR ESTIMATION" | A | AUGUST 17, 1996 |
| "ESTIMATION" | MATERIAL SECTION | AUGUST 18, 1996 |
| "REQUEST FOR ARRANGEMENT" | B | SEPTEMBER 1, 1996 |
| "DECISION" | A | SEPTEMBER 2, 1996 |
| "ORDER" | MATERIAL SECTION | SEPTEMBER 3, 1996 |
| "INSPECTION" | B | SEPTEMBER 17, 1996 |

(DISPLAY DETAILS)   (END)

FIG. 11

DISPLAY OF BUSINESS DATA

| | |
|---|---|
| NAME OF TASK : | DECISION |
| PERSON IN CHARGE : | KATO |
| DEADLINE : | SEPTEMBER 2, 1996 |
| MAIN-TASK : | PURCHASE |
| SUB-TASK : | NO TASK |
| PREVIOUS TASK : | REQUEST FOR ARRANGEMENT |
| NEXT TASK : | ORDER |
| DOCUMENT : | "DOCUMENT FOR REQUEST FOR ARRANGEMENT", "DOCUMENT FOR ESTIMATION" |

( EDITION OF DOCUMENT )   ( END )

RESULT OF RETRIEVAL OF HUMAN-UNDERSTANDABLE KNOWLEDGE — 141

| SUBJECT | WRITTEN BY | DAY OF REGISTRATION |
|---|---|---|
| "SHORTENING OF PROCEDURE FOR ESTIMATION" | E | JUN 1, 1996 |

(DISPLAY OF DETAILS) (END)

FIG. 14B

RESULT OF RETRIEVAL OF HUMAN-UNDERSTANDABLE KNOWLEDGE — 142

| SUBJECT | WRITTEN BY | DAY OF REGISTRATION |
|---|---|---|
| "PROCEDURE FOR PURCHASING ARTICLE, THE PRICE OF WHICH EXCEEDS 200,000 YEN" | D | SEPTEMBER 17, 1996 |

(DISPLAY OF DETAILS) (END)

FIG. 15

DISPLAY OF DETAILS OF HUMAN-UNDERSTANDABLE KNOWLEDGE

SUBJECT : PROCEDURE FOR PURCHASING ARTICLE, THE PRICE OF WHICH EXCEEDS 100,000 YEN

WRITTEN BY : D

DAY OF REGISTRATION: FEBRUARY 26, 1996

KEYWORD : "REQUEST FOR ARRANGEMENT", "PRICE", "100,000 YEN", "DOCUMENT", "DOCUMENT INDICATING REASON FOR USE"

CONTENTS : IF THE PRICES OF THE ARTICLE REQUIRED TO BE PURCHASED EXCEEDS 100,000 YEN, DOCUMENTS REQUIRED WHEN THE ARRANGEMENT IS REQUESTED INCREASE. THAT IS, DOCUMENT INDICATING REASON FOR USE MUST BE ADDED TO EXPLAIN THE GENERAL MANAGER THE REASON WHY THE ARTICLE IS REQUIRED TO BE PURCHASED.

FILE NAME : ⌐──153

( UPDATE )  ( REGISTER )  ( END )

DISPLAY OF BUSINESS TEMPLATE

| | |
|---|---|
| NAME OF TASK | : "REQUEST FOR ARRANGEMENT" |
| PERSON IN CHARGE | : |
| REQUIRED DAYS | : ONE DAY |
| DEADLINE | : "NEXT TASK" ~ "DEADLINE"-"ONE DAY" |
| MAIN-TASK (173) | : PURCHASE |
| SUB-TASK | : NO TASK |
| PREVIOUS TASK | : ESTIMATION |
| NEXT TASK | : DECISION |
| DOCUMENT (171) | : IF [PRICE] < "100,000 YEN" THEN "DOCUMENT FOR REQUEST FOR ARRANGEMENT", "DOCUMENT FOR ESTIMATION" ELSE "DOCUMENT FOR REQUEST FOR ARRANGEMENT", "DOCUMENT FOR ESTIMATION", "DOCUMENT INDICATING THE REASON FOR USE" |

(DISPLAY KNOW-HOW) (172)   (END)

NO HUMAN-UNDERSTANDABLE KNOWLEDGE ABOUT "REQUEST FOR ARRANGEMENT" AND "DEADLINE" WAS FOUND ( NEW REGISTRATION )   ( END )

NEW REGISTRATION OF HUMAN-UNDERSTANDABLE KNOWLEDGE

SUBJECT : DEADLINE OF REQUEST FOR ARRANGEMENT — 182
WRITTEN BY : H — 183
DAY OF REGISTRATION : JANUARY 20, 1997 — 184
KEYWORD : "REQUEST FOR ARRANGEMENT", "DEADLINE" — 185
CONTENTS : SET DEADLINE FOR REQUEST FOR ARRANGEMENT EXCEPT DAYS AFTER 25-TH DAY OF THE MONTH. IF THE ARRANGEMENT IS REQUIRED TO BE PERFORMED QUICKLY, PLEASE CONTACT FOLLOWING H, MATERIAL SECTION (EXTENSION NO. 5463). — 186

FILE NAME : — 187

COMPUTER SYSTEM FOR INTERACTIVE HELP USING HUMAN-UNDERSTANDABLE KNOWLEDGE AND COMPUTER-UNDERSTANDABLE KNOWLEDGE

BACKGROUND OF THE INVENTION

The present invention relates to a computer system for aiding various task processes, and more particularly to a computer system for interaction help using a human-understandable knowledge base and a computer-understandable knowledge base for aiding problem solving, aiding decision making, guidance, presentation of information, CSCW (Computer Supported Cooperative Work), information education and the like relating to various tasks in the engineering an office operation fields, such as design, planning, diagnosis and education.

The entire contents of Japanese Patent Application No. 8-57644 filed on Mar. 14, 1996 are incorporated herein by reference.

Since information technology has progressed in recent years, building of the office computer environment into a network structure has been rapidly performed to arrange the information infrastructure. Thus, business processes have been dispersed significantly. Moreover, processable data has been widened from conventional text data into multimedia data including figures, moving pictures and voices.

Under the foregoing circumstances, it has been attempted to commonly use, task data and task knowledge relating to the task, which have been managed in a dispersed manner, in order to improve business efficiency. Since office work has been performed by electronic methods, the process has been complicated excessively. Thus, users must bear heavy burdens. As a result, a computer system for interactive help using human-understandable knowledge and computer-understandable knowledge has been required in order to reduce the burden on users.

Hitherto, a variety of attempts have been made to cause a computer to perform a task, previously performed by an expert, by employing a problem solving helping system called an expert system or a knowledge base system.

The foregoing systems have a structure such that computer-understandable knowledge is accumulated in a form, such as a formula, a logical formula, a rule, a frame or a semantic network, which can be processed by a computer; and an inference process is performed with reference to the accumulated knowledge so as to automate problem solving which was previously performed by a human being. The foregoing expert system and the knowledge base system have been used widely in the engineering and office operation fields to solve problems in design, planning and diagnosis because the inference technology and knowledge expression technology have progressed. For example, a structure disclosed in U.S. Pat. No. 5,301,320 titled as "WORKFLOW MANAGEMENT AND CONTROL SYSTEM," filed by Digital Equipment Co., is formed such that task templates obtained by forming the task procedures into models are used to manage the workflows. In this case, the model of the task is generated by an expert of the task, that is, a designer for the workflow, to have a format determined by the system. Thus, the foregoing model can be said to be a computer-understandable knowledge base.

On the other hand, another attempt has been made such that a variety of specialist knowledge, or know-how is formed into electronic data, such as text, hyper text, figures, images, moving pictures and voice which can be understood by humans so as to be accumulated to permit a plurality of users to share accumulated data. The foregoing structure is disclosed in, for example, "Flexible Information Sharing and Handling System-Towards knowledge Propagation" Y. Seki, T. Yamakami and A. Simizu. IEICE Trans. Commun. Vol. E77-B, No. 3: P.P. 404–10.

Hereinafter, knowledge of a type which can be understood by humans (know-how) will be referred to as human-understandable knowledge." On the other hand, knowledge used to solve problems in the foregoing expert system or the knowledge base system will be referred to as "computer-understandable knowledge". Thus, the two types of above knowledge are distinguished from each other.

The human-understandable knowledge originally has an atypical form such that the contents, classification, applied conditions and the degree of precision are varied. Therefore, human-understandable knowledge is not knowledge that is suitable for a computer. However, since the human-understandable knowledge can easily be understood by a humans, the knowledge aids solving problems when a user arbitrarily retrieves and directly reads the human-understandable knowledge in a variety of situations.

The work required for the expert system or the knowledge base system to explain specialist knowledge in a computer-understandable form and accumulate it is generally difficult and complicated. The foregoing problem causes a bottleneck in acquiring computer-understandable knowledge. To extract knowledge precise analysis of the procedure for solving a problem and conditions is required. Moreover, an expert cannot always describe his know-how in a computer-understandable form. In many cases, a knowledge engineer, expert in making knowledge bases, interviews an expert. Then, knowledge obtained from the interview must be systematized and rewritten into a form which can be referred to during the inference process.

On the other hand, an expert, who is a human being, solves problems by advanced and intelligent consideration in accordance with sufficient experience, such that exceptional factors are treated flexibly. The experiential knowledge and exceptional knowledge required to solve a problem cannot usually be easily described comprehensively in computer-understandable form. The conventional expert system has a critical problem in that problems cannot be solved due to slight exceptional factors in a problem solving areas requiring non-described knowledge.

On the other hand, the contents of the human-understandable knowledge, know-how, are not considered to be processed by a computer. Since the human-understandable knowledge may be in a form which can be understood by a human being, know-how has been accumulated. Any user is able to describe and accumulate the know-how. As for the expression of human-understandable knowledge, a variety of expression means can be employed, for example, text, form, figures, images, moving pictures, voice and hyper text. Therefore, satisfactory expression can be performed compared with the rule form and the frame form. Moreover, it can easily be understood by a human being. In addition, human-understandable knowledge can easily be acquired from information such as electronic documents, drawings and images, and a natural information source in order to accumulate know-how knowledge. Moreover, the foregoing human-understandable knowledge has a characteristic that logical consistency cannot easily be maintained and erroneous experience and knowledge are sometimes included.

A system for a knowledge base system and the expert system is available which is formed such that if a problem cannot be solved, or is solved incompletely, then explanatory information relating to the problem is presented to a user in the form of a warning. In order to perform the presentation above, the designer of the knowledge base must prepare explanatory information units to be presented for all of the likely cases where a problem cannot be solved. This imposes an excessively heavy burden on the designer. Moreover, explanatory information above has been included in each knowledge base while being in the form which depends upon the knowledge and the inference means. Therefore, explanatory information cannot be shared among plural knowledge bases.

Another system exists where knowledge used during a problem solving process using the computer-understandable knowledge, for example, a rule applied in the inference process, is presented to a user. However, human-understandable knowledge which is presented with the foregoing system is knowledge described in the computer-understandable form. Therefore, a human being cannot easily read it. Since the above-mentioned function is structured mainly for the knowledge engineer to trace or debug the human-understandable knowledge, it is not used as guidance for a user to solve a problem.

BRIEF SUMMARY OF THE INVENTION

An object of the present invention is to provide a computer system having a structure in which computer-understandable knowledge in a computer processable for and human-understandable knowledge in the form understandable by humans are complementarily applied to perform more appropriate problem solving and guidance if the problem cannot be solved, or a result is incomplete, using only the computer-understandable knowledge.

According to a first aspect of the present invention, there is a computer system comprising: a first knowledge base for storing human-understandable knowledge in order to retrieve and display knowledge related to a problem to be solved; a second knowledge base for storing computer-understandable knowledge in order to obtain and display a solution of the problem to be solved by using the computer-understandable knowledge; and control means for complementarily using the first knowledge base and the second knowledge base, for retrieving from the first knowledge base human-understandable knowledge related to the problem to be solved, in accordance with a state of execution of a problem solving process or a result of the process by the second knowledge base, and for displaying the human-understandable knowledge; wherein the first knowledge base and the second knowledge base function independently from each other.

According to a second aspect of the present invention, there is provided a computer program product for use in a computer system independently having a first knowledge base for storing human-understandable knowledge and a second knowledge base for storing computer-understandable knowledge, the computer program product comprising: computer readable program code means for causing the second knowledge base to obtain a resolution of a problem to be solved by using computer-understandable knowledge; and computer readable program code means for causing the first knowledge base to retrieve and display human-understandable knowledge related to the problem to be solved in accordance with a state of execution of a problem solving process or a result of the process by the second knowledge base.

According to the present invention, any one or a plurality of notifications of the following notifications issued from the inference portion of the computer-understandable knowledge base are acquired: a problem which is an object of the problem solving. process performed by the computer-understandable knowledge base: a whether the problem solving process can be performed/cannot be performed; a step in the process which cannot be executed if the problem solving process cannot be performed; validity/completeness of a solution obtained as a result of the process; valid/invalid factor if the solution is invalid/incomplete; and computer-understandable knowledge used in the problem solving process; the notification being acquired from the inference portion of the computer-understandable knowledge base.

Then, the notification acquired from the inference portion is interpreted to generate retrieving conditions for retrieving the human-understandable knowledge relating to the problem to be solved and a result of the process from the know-how knowledge base. The generated retrieving conditions are supplied to the retrieving means of the knowledge base, in order to retrieve the human-understandable knowledge.

Finally, the retrieved human-understandable knowledge is, through the interface for presenting the human-understandable knowledge in the human-understandable knowledge base, displayed to a user.

As a result of the above-mentioned process, the user is enabled to refer to the human-understandable knowledge relating to the problem to be solved in the manner related to the process for solving the problem performed by the computer-understandable knowledge base and a solution obtained as a result of the process. Since the conditions for retrieving the human-understandable knowledge are automatically generated in accordance with the problem solving process and a result of the process performed by the computer-understandable knowledge base, the user is able to easily refer to the related human-understandable knowledge without setting the retrieving conditions for retrieving the human-understandable knowledge.

If problem solving by the computer-understandable knowledge base cannot be performed or has been performed incompletely, the user is able to refer to the human-understandable knowledge relating to the problem to be solved to use it to help in problem solving. With the conventional computer-understandable knowledge base and the expert system, a user cannot usually obtain a method for or a guide to solving the problem if the problem solving process has failed or the obtained solution is incomplete. In this case, the user must either ask an expert to obtain solving means or individually obtain human-understandable knowledge. According to the present invention, the foregoing operation can be reduced and thus the problem solving efficiency can be improved.

Since the structure according to the present invention is arranged such that the human-understandable knowledge base and the computer-understandable knowledge base are independent from each other, each knowledge base can be individually used. Moreover, one human-understandable knowledge base can be shared to supplement a plurality of computer-understandable knowledge bases in order to solve problems. Thus, the operation for accumulating and managing human-understandable knowledge can be reduced.

It is preferable that the computer system according to the present invention be provided with customizing means for customizing functions of the control means for retrieving condition for displaying human-understandable knowledge to the user. In this case, the user is able to precisely set the conditions for whether or not the human-understandable knowledge is displayed in relation to the state of execution of the problem solving process or the result of the process by the computer-understandable knowledge base.

By using the customizing functions of the control means for setting the retrieving condition for human-understandable knowledge to be displayed, human-understandable knowledge relating to the problem to be solved can easily be selected from human-understandable knowledge relating to the computer-understandable knowledge applied to the inference process.

The conditions for retrieving the human-understandable knowledge may be automatically generated. The user may arbitrarily modify the retrieving conditions. As a result, the user can flexibly perform an interactive operation such that human-understandable know-how knowledge is retrieved under a certain retrieving condition and the limitation of the retrieving condition is intensified or moderated in accordance with the result of the retrieval, in order to again perform the retrieval.

It is preferable that means for a user to update the human-understandable knowledge base be provided. The user can use the means registering, modifying and deleting the human-understandable.

It is preferable that means be provided which displays the computer-understandable knowledge base and the human-understandable knowledge base in a form which can be understood by humans. By simultaneously displaying and using complementarily computer-understandable knowledge and human-understandable knowledge which can easily be understood by humans, the validity of the human-understandable knowledge can be confirmed. Moreover, the computer-understandable knowledge, which cannot easily be understood by humans, can easily be understood in this form.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2D are diagrams showing computer-understandable knowledge in a task procedure generating system which is an example of the computer-understandable knowledge base shown in FIG. 1;

FIGS. 3A to 3D are diagrams showing computer-understandable knowledge in a task procedure generating system which is an example of the computer-understandable knowledge base shown in FIG. 1;

FIG. 4 is a diagram showing an example of data relating to the organization according to this embodiment;

FIGS. 5A to 5E are diagrams showing human-understandable knowledge accumulated in a human-understandable knowledge base according to this embodiment;

FIG. 9 is a diagram showing an example of a task name input interface screen of the task procedure generating system which is an example of the computer-understandable knowledge base according to this embodiment;

FIGS. 10A and 10B are diagrams showing an example of a parameter input interface screen of the task procedure generating system which is an example of the computer-understandable knowledge base according to this embodiment;

FIG. 11 is a diagram showing an example of a result of generation of the task procedure performed by the task procedure generating system which is an example of the computer-understandable knowledge base according to this embodiment;

FIG. 12 is a diagram showing an example of a detailed result of generation of the task procedure performed by the task procedure generating system which is an example of the computer-understandable knowledge base according to this embodiment;

FIGS. 14A to 14D are diagrams showing an example of an interface screen for presenting a list of human-understandable knowledge retrieved from the human-understandable knowledge base according to this embodiment;

FIG. 15 is a diagram showing an example of an interface screen for presenting detailed contents of human-understandable knowledge retrieved from the human-understandable knowledge base according to this embodiment;

FIG. 17 is a diagram showing an example of an interface screen for presenting detailed contents of a task template retrieved from the computer-understandable knowledge base according to this embodiment;

FIGS. 18A and 18B are diagrams showing an example of an interface screen for registering computer-understandable knowledge and related human-understandable knowledge according to this embodiment;

DETAILED DESCRIPTION OF THE INVENTION

Figure 1:
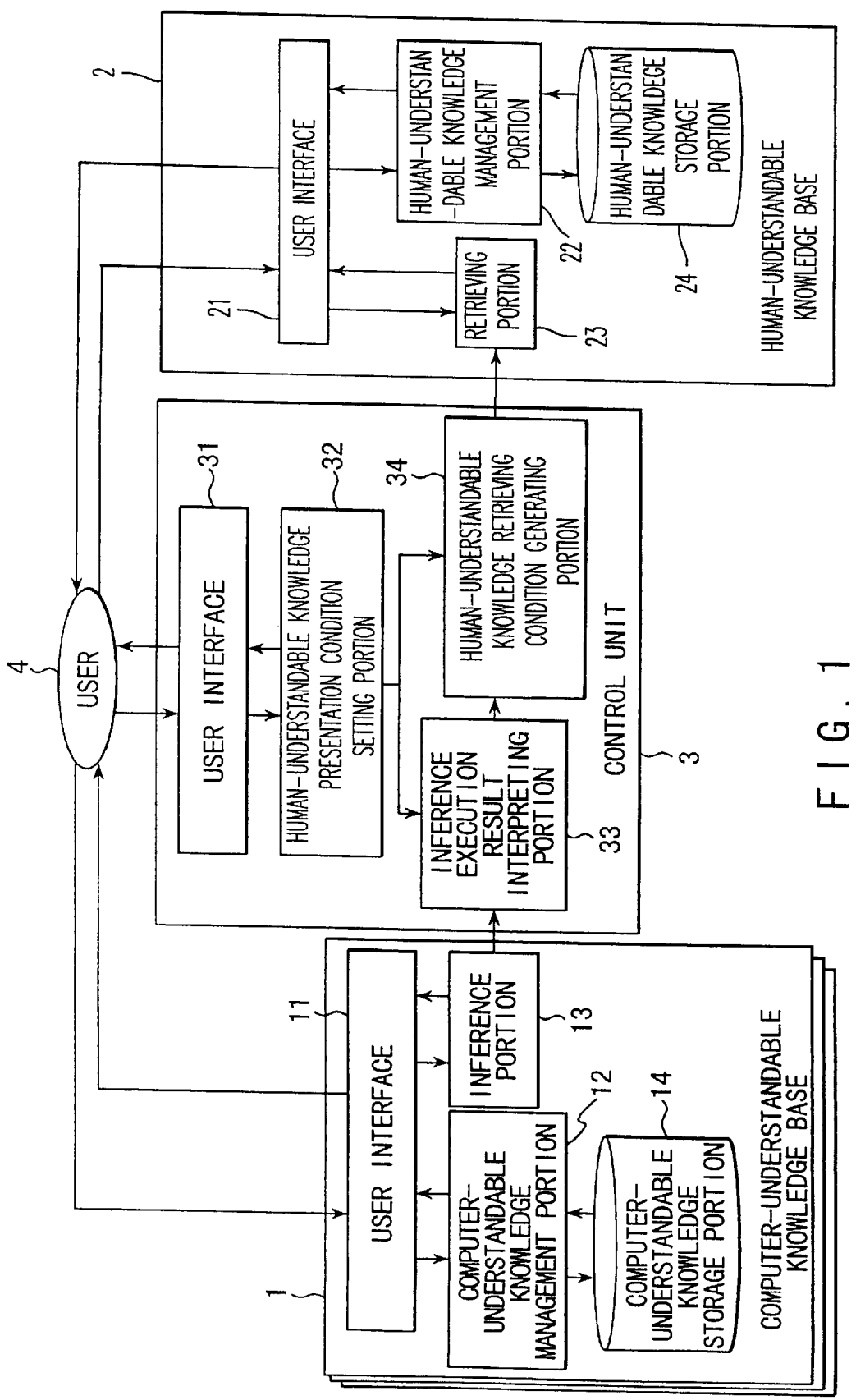
FIG. 1 is a block diagram showing the structure of an computer system according to an embodiment of the present invention.

Referring to the drawings, an embodiment of the present invention will now be described.

FIG. 1 is a block diagram showing the schematic structure of a computer system according to this embodiment.

Referring to FIG. 1, reference numeral 1 represents a group composed of at least one computer-understandable knowledge base. Each computer-understandable knowledge base 1 has a computer-understandable knowledge storage portion 14 for storing computer-understandable knowledge, a computer-understandable knowledge management portion 12 for adding/deleting/modifying the computer-understandable knowledge stored in the computer-understandable knowledge storage portion 14, an inference portion 13 which uses the computer-understandable knowledge management portion 12 to refer to the computer-understandable knowledge stored in the computer-understandable knowledge storage portion 14 so as to execute the inference process for solving a problem and a user interface 11 with which a user 4 edits the computer-understandable knowledge by using the computer-understandable knowledge management portion 12, or the user 4 performs an inference process by inputting to the inference portion 13 and which presents an obtained result of the inference to the user 4.

Reference numeral 2 represents a human-understandable knowledge base 2 in which human-understandable knowledge understandable by humans is stored and from which it is used. The human-understandable knowledge base 2 has a knowledge storage portion 24 for storing human-understandable knowledge, a human-understandable knowledge management portion 22 for adding/deleting/modifying knowledge stored in the human-understandable knowledge storage portion 24, a retrieving portion 23 which uses the human-understandable knowledge management portion 22 to retrieve the human-understandable knowledge stored in the human-understandable knowledge storage portion 24 and a user interface 21 with which the user 4 edits the know-how knowledge by using the human-understandable knowledge management portion 22, the user 4 retrieves the human-understandable knowledge by retrieving conditions from the retrieving portion 23 and which also presents an obtained result of the retrieval to the user 4.

Reference numeral 3 represents a control unit for retrieving the human-understandable knowledge from the human-understandable knowledge base 2 to present the know-how knowledge in accordance with a state of a process where the problem is being solved by the computer-understandable knowledge base group 1 or with a result of the process. The control unit 3 has an inference execution result interpreting portion 33 for acquiring and interpreting a notification of a state of the process where the problem is being solved or a result of the process, a human-understandable knowledge retrieving condition generating portion 34 for generating retrieving conditions for retrieving the human-understandable knowledge from the human-understandable knowledge base 2, a human-understandable knowledge presentation condition setting portion 32 for setting conditions about a state of a process or a result of the process for solving the problem by the computer-understandable knowledge base 1 as conditions for presenting the human-understandable knowledge and for editing the retrieving conditions automatically generated by the human-understandable knowledge retrieving condition generating portion 34, and a user interface 31 which is an interface with which the user uses the human-understandable knowledge presentation condition setting portion 32.

The internal structure and the internal process in each of the computer-understandable knowledge base group 1 and the human-understandable knowledge base 2, which are elements of the computer system according to this embodiment, are not limited. That is, the computer-understandable knowledge base group 1 and the human-understandable knowledge base 2 may be conventional systems belonging to conventional technology. An essential portion of this embodiment is the internal structure and the internal process of the control unit 3 and a portion in which the computer-understandable knowledge base group 1 and the human-understandable knowledge base 2 are unified by the control unit 3 so as to be complementarily used.

The principle of the operation of the computer system according to this embodiment will now be described such that a case is taken as an example in which procedures of various tasks in an office are generated, and the flows and periods of the tasks and documents are managed to guide a user. In this case, a "task procedure generating system" to be described below is one of the systems in the computer-understandable knowledge base group 1 shown in FIG. 1. The human-understandable knowledge base 2 shown in FIG. 1 is a base for storing a variety of human-understandable knowledge items used in the office task.

Initially, examples of the computer-understandable knowledge and the know-how knowledge for use in solving problems will now be described.

In the "task procedure generating system", templates shown in FIGS. 2A to 2D and 3A to 3D and data relating to the organization shown in FIG. 4 are stored in the computer-understandable knowledge storage portion 14 as the computer-understandable knowledge relating to the office task. As shown in FIGS. 2A to 2D and 3A to 3D, attributes for describing management information of the task, such as name of task, person in charge, main/sub-task, previous/next task and deadline are defined in the template of task data. Moreover, the computer-understandable knowledge for inferring the attribute value of the attribute is described in each attribute, if necessary. Specifically, the computer-understandable knowledge includes knowledge for developing a certain task when the task is performed, knowledge relating to an execution procedure of the sub-task, knowledge of organizations and persons who must perform corresponding tasks, knowledge of types of documents which must be produced in corresponding tasks.

For example, the "sub-task" of the task template (portion 21 of FIG. 2) of task data called "purchase" has the following description classified in accordance with the "price" and "classification of product":

If the price is 10,000 yen or higher but lower than 200,000 yen and the product classification is the product of the company, "request for arrangement"→"decision"→"order"→"inspection"

If the price is 10,000 yen or higher but lower than 200,000 yen and the product classification is not the product of the company, "request for estimation"→"approval of request for estimation"→"estimation"→"request for arrangement"→"decision"→"order"→"inspection"

If the price is 10,000 yen or lower,

"request for arrangement"→"order"→"inspection"

The process is developed to the foregoing sub-task in the format shown in portion 23 shown in FIG. 2A. The elements in brackets [] are elements which must be input by a user as input parameters required to perform the inference.

As the "constraint", computer-understandable knowledge having a meaning that the "deadline of the task is a tomorrow" is described (portion 24 of FIG. 2A).

In the "request for estimation" (portion 25 of FIG. 2B) which is one of the sub-tasks of the task "purchase", for example, that the computer-understandable knowledge 26 "deadline" is one day before the next task, that is, one day before the deadline of the "approval of request for estimation" is described. The foregoing description means that the process of "request for estimation" must be completed at least one day before the deadline of the "approval for request for estimation" because the process "approval of request for estimation" takes one day. Symbol "~" is a notation when a value is obtained by following the attribute of task data and person/organization data. Specifically, the description "next task ~ deadline" means a value of "deadline", which is the attribute of task data, set as the value of "next task" which is the attribute of subject task data.

In the task "approval of request for estimation" (portion 27 shown in FIG. 2C) which is one of the sub-tasks of the task "purchase", for example, a computer-understandable knowledge 28 is described in which the "person in charge" is the manager. This is the parameter [person in charge] input as the person in charge of the task "purchase". In also FIGS. 3A to 3D, task templates such as "request for arrangement" and "order" which are sub-tasks of the task "purchase" and accompanying computer-understandable knowledge are described.

FIG. 4 is a diagram showing an example of data relating to the organization in which the hierarchy of the organization and the number of members in each department are illustrated. Referring to FIG. 4, "first section" 42 and "second section" 43 exist as the lower organization of "management department" 41, the members in the "first section" are "A" 44, "B" 45 and "C" 46. Moreover, the manager of the "second section" is "A" 44.

FIGS. 5A to 5E are diagrams showing examples of human-understandable knowledge stored in the human-understandable knowledge storage portion 24 of the human-understandable knowledge base 2 shown in FIG. 1. In this embodiment, each knowledge item is composed of the contents of the human-understandable knowledge, additional information consisting of "title", "person who wrote the human-understandable knowledge", "date of registration" and "keyword" for retrieving the human-understandable knowledge. For example, human-understandable knowledge 51 relating to the "procedure for purchasing an article, whose price exceeds 100,000 yen" is formed such that the person who has written the human-understandable knowledge 51 is "D", the date of registration is "Aug. 18, 1996", keywords "purchase", "request for arrangement", "price", "100,000 yen", "document" and "document describing reason for use" are written. As the contents, human-understandable knowledge that "a document describing the reason for use is required if the price exceeds 100,000 yen" is described (see FIG. 5A). Although this embodiment has the structure such that the contents of the know-how are in the form of a simple text, the form is not limited to this. For example, another form, such as a figure, a table, an image, a moving picture, voice or hyper text, or their combination may be employed. "Title", "person who has written the human-understandable knowledge", "date of registration" and "keyword" are included as additional information and retrieving keys of the human-understandable. The foregoing form is a simple form. In addition to the foregoing factors, relative information between a plurality of human-understandable knowledge items and security information on whether or not know-how may be presented may be added.

Referring to a flow chart showing the processing procedure shown in FIGS. 6 to 8, a specific processing procedure will now be described in which the computer-understandable knowledge and human-understandable knowledge are used to generate the processing procedure of the task "purchase" and related human-understandable knowledge is presented.

The process will now be described schematically.

In the computer-understandable knowledge base group 1, the computer-understandable knowledge is used to perform a process for inferring for generating the task procedure in accordance with input by the user 4. Information of the state of execution and a result of the inference process, for example, referred knowledge during the inference process and whether or not the solution satisfies the constraint is successively notified to the control unit 3. The control unit 3 interprets the notified state of execution and a result of the process and generates retrieving conditions for retrieving relative human-understandable knowledge in accordance with human-understandable knowledge presentation conditions instructed by the user 4, in order to notify the same to the human-understandable knowledge base 2. The human-understandable knowledge base 2 retrieves the human-understandable knowledge in accordance with the retrieving conditions supplied from the control unit 3 so as the present the same to the user 4.

The processes respectively performed by the computer-understandable knowledge base group 1, the control unit 3 and the human-understandable knowledge base 2 will now be described. Initially, the task procedure generating process, which is performed by the computer-understandable knowledge base group 1 will be described with reference to a flow chart shown in FIG. 6.

Figure 6:
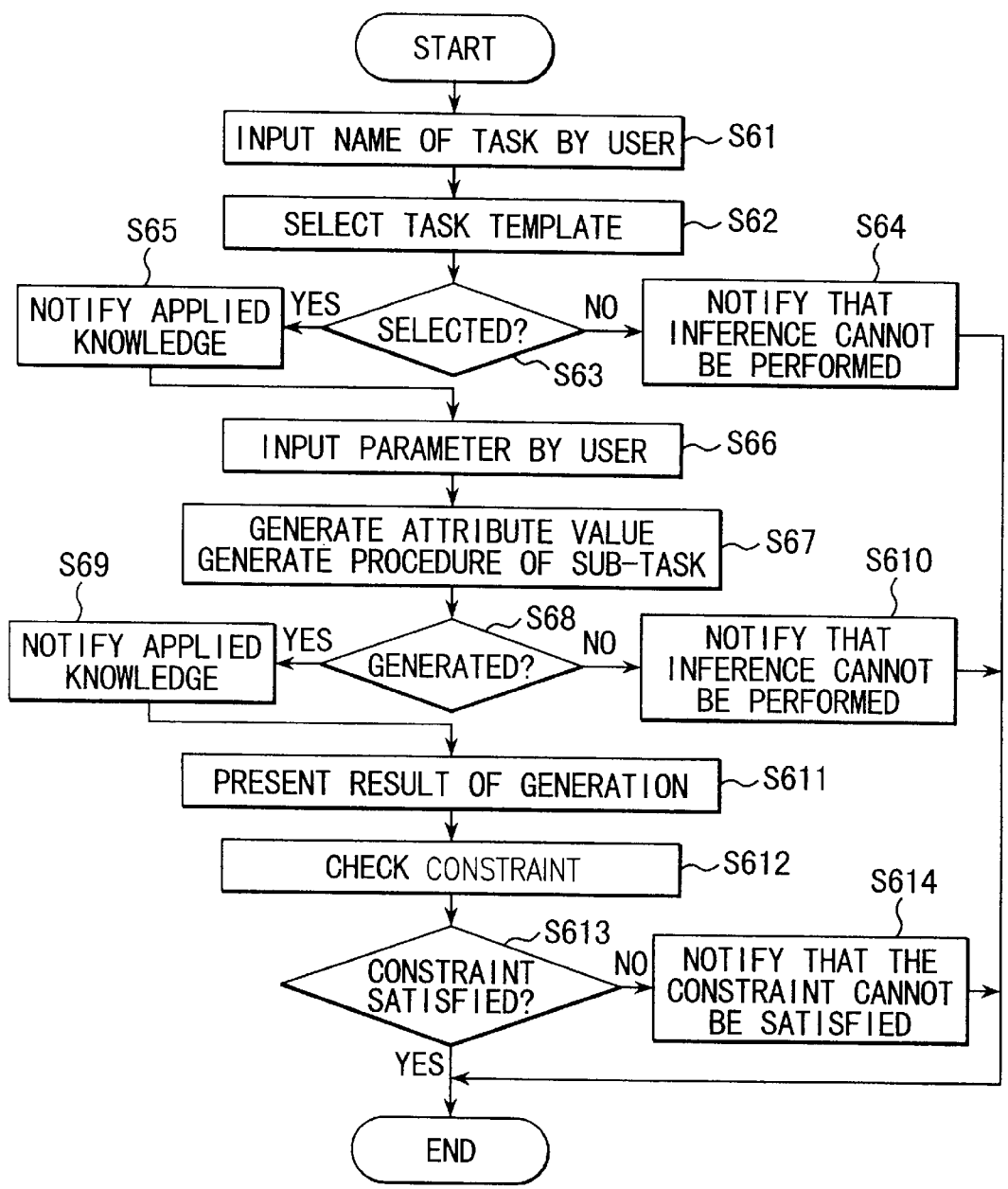
FIG. 6 is a flow chart of a process performed by the task procedure generating system which is an example of the computer-understandable knowledge base according to this embodiment.

When the task procedure generating system, which is an example of the computer-understandable knowledge base group 1, has been turned on, it requests the user 4 to input the name of a task, whose procedure must be generated (S61 shown in FIG. 6). FIG. 9 is a diagram showing an example of a user interface of the computer-understandable knowledge base group 1 with which the user 4 inputs the name of the task. The user 4 inputs, for example, task "purchase" as a name of the task, whose procedure must be generated.

Then, the computer-understandable knowledge base group 1 selects a task template corresponding to the input name of the task through the computer-understandable knowledge management portion 12 (S62 shown in FIG. 6). In this case, a template of task data corresponding to "purchase" is selected. If the task template cannot be found (N of S63 shown in FIG. 6), the task procedure cannot be generated. Therefore, a notification message meaning that "inference cannot be performed" is supplied to the control unit 3 (S64 shown in FIG. 6). If the name of the task input, as shown in FIG. 9, is "request for a holiday", whose template is not stored in the computer-understandable knowledge storage portion 14, a notification message in the following form is generated:

"inference cannot be performed: 0, request for holiday"

The generated message that the inference cannot be performed is notified to the control unit 3. If a corresponding task template can be selected (Y of S63 shown in FIG. 6), the template is used as the knowledge for the procedure generation in the following process. Therefore, notification of the following applied knowledge is supplied to the control unit 3 (S65 shown in FIG. 6):

"applied knowledge: 5, purchase, sub-task, price, classification of product"

Then, parameters required to generate the attributes of the selected task template and the procedure of the sub-task are input by the user 4 (S66 shown in FIG. 6). FIGS. 10A and 10B show an example of the input interface. The parameters required for the inference are described in the task template. For example, the task "purchase" requires five input parameters including [name of article], [classification of product], [price], [required delivery] and [person in charge]. The input interface 101 shown in FIG. 10A is an example of the interface when the product named "communication modem" is purchased, while input interface 102 shown in FIG. 10B is an example of the interface when the product named "personal computer" is purchased.

Then, the inference portion 13 sequentially applies computer-understandable knowledge described in each attribute of the selected task template to generate each attribute value and the procedure of the sub-task (S67 shown in FIG. 6). For example, parameter [person in charge] (parameter 22 shown in FIG. 2) "B" input with the interface 101 shown in FIG. 10A is as it is set in the attribute "person in charge" of the task "purchase". As the attribute "deadline", "Sep. 17, 1996" input as parameter [required delivery] is set. When the task "purchase" is developed to the sub-task, a reference is made to the computer-understandable knowledge (23 shown in FIG. 2A) set as the attribute "sub-task" of the task "purchase". In accordance with the input parameter, the sub-task is developed and an order is given. In an example of input shown in FIG. 10A, the parameter [price] is 10,000 yen or higher but lower than 200,000 yen and the parameter [classification of product] is "out of the company", development is performed as "request for estimation"→"approval of request for estimation"→"estimation"→"request for arrangement"→"decision"→"order"→"inspection" and an order is given. Also the sub-task and each attribute value of each of the developed sub-task are generated by using the computer-understandable knowledge described in the task template of each sub-task. When the attribute "person in charge" of task data of the task "decision" is generated, the computer-understandable knowledge (32 shown in FIG. 3B) relating to the price of the article requiring purchase and a person who makes a decision and data (see FIG. 4) relating to organization/person are applied. In this case, the [price] of the article requiring purchase is lower than 100,000 yen, the decision is performed by a manager of a section to which "B" who is the [person in charge] belongs. In accordance with data the organization/person data shown in FIG. 4, the manager of the "first section" 42, to which "B" 45 belongs, is "A" 44. Therefore, it can be inferred that the "person in charge" of the task "decision" is "A".

If the attribute value and the sub-task procedure can be generated in the inference process in S67 shown in FIG. 6 (Y in S68 shown in FIG. 6), information relating to the applied computer-understandable knowledge is successively notified to the control unit 3 (S69 shown in FIG. 6).

In this embodiment, the sentence notifying the applicable knowledge is generated from the name of the task template, the name of the attribute described in the applied computer-understandable knowledge and the parameter such as "price" included in the computer-understandable knowledge. For example, as for the knowledge applied when the "person in charge" of the task "decision" is inferred, the following applied knowledge notification sentence is generated so as to be notified to the control unit 3:

"applied knowledge: 3, decision, person in charge, price"

The numeral "3" in the notification sentence indicates the complexity of the applied knowledge, the numeral being used as a degree for determining the serviceability when human-understandable knowledge relating to the knowledge applied to solve the problem in the human-understandable knowledge base 2 is retrieved and displayed. The complexity is calculated from the number of divisions with "if" of the parameter name, such as [price] included in the computer-understandable knowledge described in the applied computer-understandable knowledge.

For example, since the knowledge applied to decide the "person in charge" of the "decision" includes parameters [price] and [person in charge], the number is two. Since one "if" for the case division is included, the number is one. Therefore, the complexity is "3" which is the total of the foregoing values.

If the computer-understandable knowledge cannot be applied and the attribute value and the sub-task procedure cannot be generated (N in S68 shown in FIG. 6), the control unit 3 generates a sentence having a meaning that the inference cannot be performed to notify the control unit 3 (S610 shown in FIG. 6). Thus, the inference process is ended. If the user 4 inputs the input parameter of the task "purchase" as 102 shown in FIG. 10B, knowledge for proceeding to the sub-task is insufficient with respect to an article, the [price] of which exceeds 200,000 yen (23 shown in FIG. 2A). Therefore, name of task template, name of attribute in which the computer-understandable knowledge, which has failed in the application, is described, and name of attribute and name of parameter included in the computer-understandable knowledge are used to generate the following notification sentence meaning that the inference cannot be performed to notify the same to the control unit 3:

"inference cannot be performed: 5, purchase, sub-task, price, classification of product"

When the task procedure has been generated, the task procedure generating system according to this embodiment presents the generated result to the user 4 through the user interface 11 (S611 shown in FIG. 6). FIG. 11 shows an example of presentation of a result of the generated task procedure in a case where the input parameter of the task "purchase" has been input as 101 shown in FIG. 10A. As shown in FIG. 11, the sub-task of the task "purchase" is proceeded and "person in charge" and "deadline" inferred in each of the sub-tasks are presented. FIG. 12 shows an example of detailed display of each task data item. For example, task data of task "decision" has attributes "person in charge", "deadline" and "document" obtained as a result of the above-mentioned inference process. The user 4 performs a process for, for example, making a required document by referring to the foregoing values.

The inference portion 13 of the task procedure generating system according to this embodiment checks the constraint with respect to the generated task procedure (S612 shown in FIG. 6). For example, task "purchase" and its sub-tasks has a computer-understandable knowledge described as "deadline" ≧ "today"

meaning that "deadline of the task is after today" as a constraint relating to the deadline (24 shown in FIG. 2A and the like). If the procedure of the task was generated on "Aug. 20, 1996", tasks "request for estimation", "approval of request for estimation" and "estimation" among the tasks shown in FIG. 11 do not satisfy the constraint relating to the deadline. In this case (N in S613 shown in FIG. 6), the inference portion 13 generates a notification sentence meaning that the constraint cannot be satisfied and notifies this to the control unit 3 (S614 shown in FIG. 6). In the case of the task "purchase", the following notification sentence meaning that the constraint cannot be satisfied is generated in accordance with the name of the task template and the attribute name "deadline" included in the constraint:

"constraint cannot be satisfied: 0, request for estimation, deadline"

"constraint cannot be satisfied: 0, approval of request for estimation, deadline"

"constraint cannot be satisfied: 0, estimation, deadline"

The notification sentence is notified to the control unit 3.

The process which is performed by the control unit 3 such that a requirement is made to the human-understandable knowledge base to present the human-understandable knowledge in response to the various notification sentences notified from the computer-understandable knowledge base group 1 will now be described with reference to FIG. 7.

Figure 7:
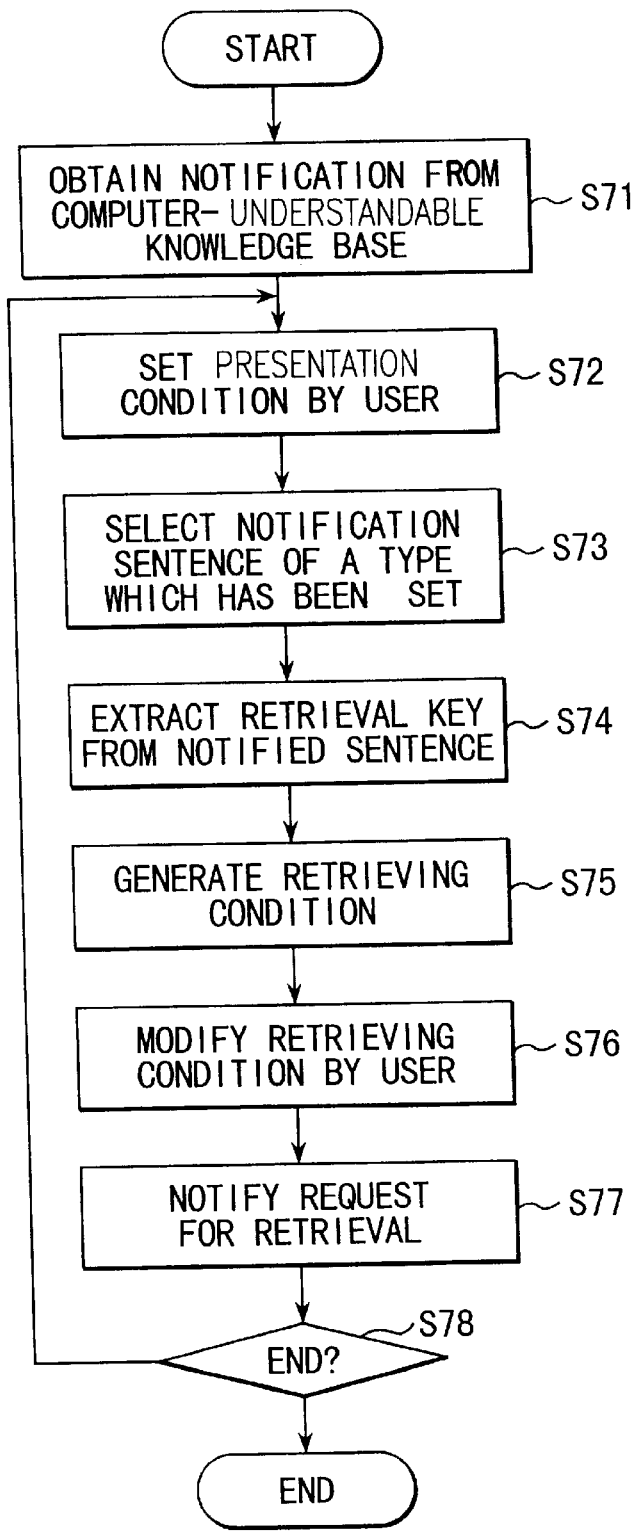
FIG. 7 is a flow chart of a process performed by a control unit according to this embodiment.

Initially, the inference execution result interpreting portion 33 acquires notification sentences successively notified from the computer-understandable knowledge base group 1 and relating to the state of execution and a result of the process (S71 shown in FIG. 7). Since the notification sentences are classified into three types including "applied knowledge", "inference cannot be performed" and "constraint cannot be satisfied", the notification sentences are classified by type when stored. Although the type and format of the notification sentence according to this embodiment are realized by enumerating the four types of classifications, name of template, complexity of knowledge, name of attribute and name of parameter, the present invention is not limited to the foregoing type and format. The notification sentence is required only to include information such as the execution process of the inference performed by the computer-understandable knowledge base group 1, computer-understandable knowledge used in performing the inference, whether or not a solution was obtained and whether the solution is perfect/valid, the information items being required to be classified and described.

Then, the human-understandable knowledge presentation condition setting portion 32 presents to the user 4 an input screen for inputting know-how presenting conditions, serviceability selecting conditions and retrieving conditions to urge the user 4 to set the factors (S72 shown in FIG. 7). This embodiment includes three types of presenting conditions:

Presenting Condition (1): referred knowledge during the inference process and all of the human-understandable knowledge relating to the factors that the inference cannot be performed or that constraint cannot be satisfied are presented. That is, relative human-understandable knowledge is presented regardless of whether or not a solution is obtained.

Presenting Condition (2): only in a case where the inference cannot be performed, human-understandable knowledge relating to this factor is presented.

Presenting Condition (3): only in a case where the constraint cannot be satisfied, human-understandable knowledge relating to this factor is presented.

Figure 13:
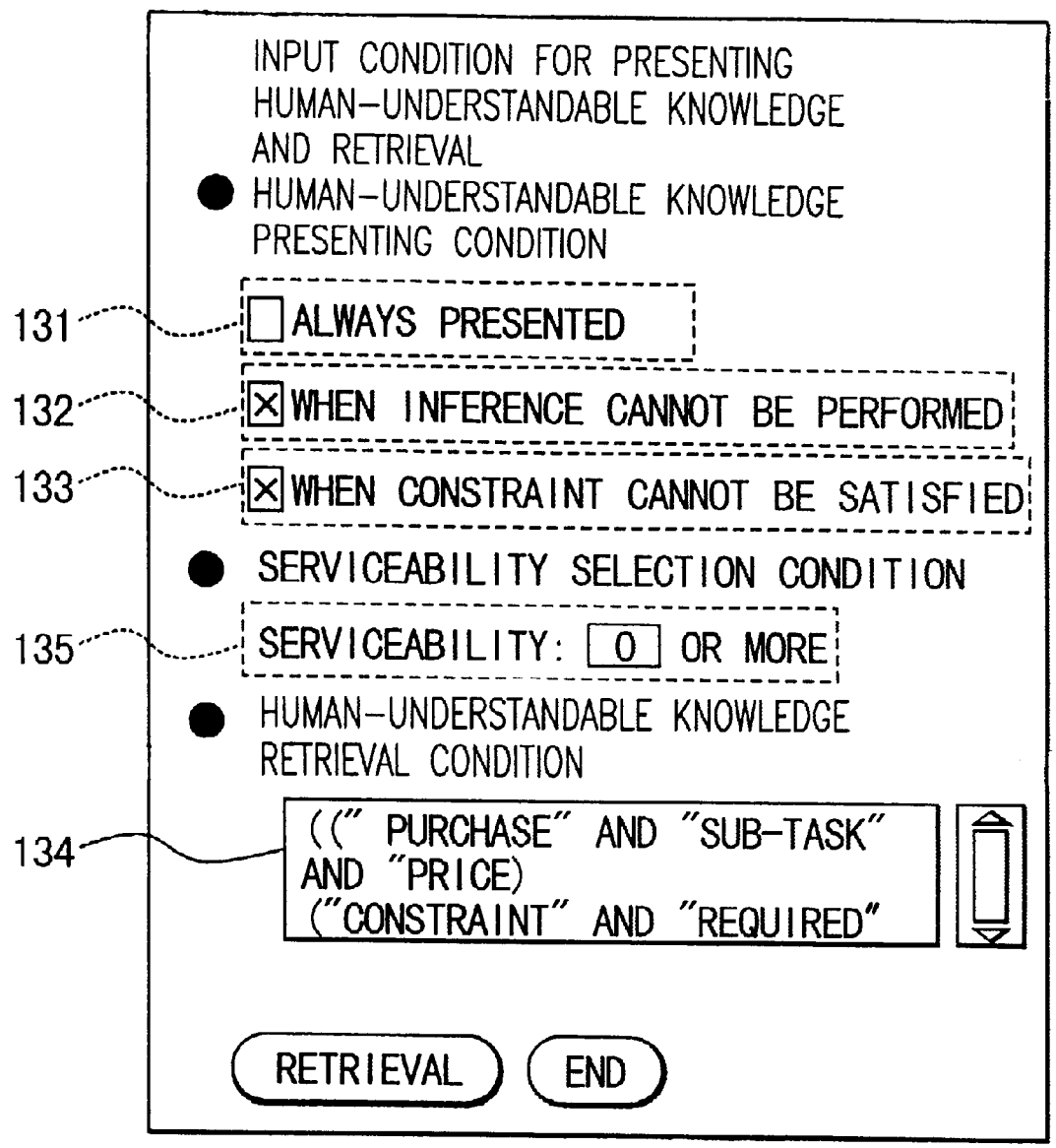
FIG. 13 is a diagram showing an example of an interface screen of a human-understandable knowledge presentation condition setting means according to this embodiment.

FIG. 13 is a diagram showing an example of an input screen for inputting presenting conditions of human-understandable knowledge, serviceability selecting conditions and retrieving conditions. The foregoing presenting conditions (1), (2) and (3) correspond to "always presented" 131, "when inference cannot be performed" 132 and "when constraint cannot be satisfied" 133 shown in FIG. 13.

When the presenting conditions have been set by the user 4, the inference execution result interpreting portion 33 selects only notification sentences relating to the presentation of the human-understandable knowledge (S73 shown in FIG. 7). In this embodiment, all of the notification sentences are selected in the case of presenting condition (1). In the case of presenting condition (2), a notification sentence meaning that the inference cannot be performed is selected. In the case of the presenting condition (3), a notification sentence meaning that the constraint cannot be satisfied is selected. In the case where both of the presenting conditions (2) and (3) are set, all of the notification sentences meaning that the inference cannot be performed and notification sentences meaning that the constraint cannot be satisfied are selected.

Then the serviceability selecting condition is set by the user 4. In this embodiment, the complexity of computer-understandable knowledge relating to the human-understandable knowledge is employed as the serviceability of the know-how. The complexity is calculated from the number of parameters included in the computer-understandable knowledge and the number of case divisions. It can be considered that the more the number increases, the more complex contents are described, that is, the human-understandable knowledge is a more important factor for solving the problem. Also the human-understandable knowledge for solving the problem and relating to the computer-understandable knowledge is considered to be serviceable for solving the problem.

The serviceability selecting conditions are set by the numeral of the complexity of the applied human-understandable knowledge. Symbol 135 shown in FIG. 13 shows an example of the input screen for the serviceability selecting conditions. The human-understandable knowledge retrieving condition generating portion 34 selects notification sentences, the complexity of which is larger than a value set as the serviceability selecting conditions from the selected notification sentences.

Then, the human-understandable knowledge retrieving condition generating portion 34 extracts a retrieving key required to retrieve the human-understandable knowledge from the notification sentences selected with the serviceability selecting conditions (S74 shown in FIG. 7). Then, the retrieving conditions are automatically generated from the retrieving key (S75 shown in FIG. 7). In this embodiment, the notification sentence is composed of data enumerating name of template, name of attribute and name of parameter. Therefore, the foregoing words are extracted as retrieving keys. Then, the retrieving condition is generated for one notification sentence as a logical product (AND) of the foregoing words. If a plurality of notification sentences are provided, the retrieving condition is generated as a logical product of the work generated for each notification sentence.

It is assumed that the notification sentences notified by the computer-understandable knowledge base group 1 are accumulated as follows. The following is an example of the foregoing notification sentences notified when the procedure of the task "purchase" is generated.

"applied knowledge: 5, purchase, sub-task, price, classification of product"

"applied knowledge: 0, request for estimation, deadline"

"applied knowledge: 2, request for arrangement, document, price"

"applied knowledge: 3, decision, person in charge, price".............................................

"applied knowledge: 0, order, deadline"

"constraint cannot be satisfied: 0, request for estimation, deadline"

"constraint cannot be satisfied: 0, approval of request for estimation, deadline"

"constraint cannot be satisfied: 0, estimation, deadline"

It is assumed that retrieving conditions (2) and (3) have been set in the human-understandable knowledge presentation condition setting portion 32. Moreover, 0 is assumed to be set as the serviceability selecting condition. In this case, a notification sentence selected in S73 shown in FIG. 7 is as follows and relates to the addition of limiting condition:

"constraint cannot be satisfied: 0, approval of estimation, deadline"

"constraint cannot be satisfied: 0, approval of request for estimation, deadline"

"constraint cannot be satisfied: 0, estimation, deadline"

The following words are sequentially extracted from each notification sentence:

"approval of estimation", "deadline"

"approval of request for estimation", "deadline"

"estimation", "deadline"

Thus, the following retrieving sentences are generated:

"(("request for estimation" AND "deadline") OR ("approval of request for estimation" AND "deadline") OR ("estimation" AND "deadline"))"

Note that the generated retrieving sentences may be converted as follows by a process for simplifying the description of the conjunction and the disjunction (OR):

"(("request for estimation" OR "approval of request for estimation" OR "estimation") AND "deadline")"

If a synonym must be considered, for example, if "appointed day" and "deliver" exist as the synonyms of the word "deadline", the retrieving sentence may be arbitrarily modified in consideration of the synonyms:

"(("request for estimation" OR "approval of request for estimation" OR "estimation") AND ("deadline" OR "appointed day" OR "delivery"))"

The process for deforming the retrieving sentence in consideration of the synonyms may be performed such that the human-understandable knowledge retrieving condition generating portion 34 is provided with knowledge about the synonyms to be used or the structure of the control unit 3 may be deformed or the foregoing function may be provided for the inside portion of the human-understandable knowledge base 2.

The retrieving conditions generated in S75 shown in FIG. 7 are displayed on the interface for the user 4 to edit the human-understandable knowledge retrieving conditions as shown in FIG. 13 (134 shown in FIG. 13). The user 4 uses the human-understandable knowledge presentation condition setting portion 32 to arbitrarily modify the generated retrieving conditions (S76 shown in FIG. 7). In synchronization with the retrieval execution command, which is issued on the interface from the user 4, the control unit 3 issues a request for retrieval to the human-understandable knowledge base 2 (S77 shown in FIG. 7). The retrieval and presentation of the human-understandable knowledge are performed by the human-understandable knowledge base 2 as described later. After the user 4 has referred to the human-understandable knowledge, the operation may be completed (Y in S78 shown in FIG. 7) or the user 4 may again set the presenting conditions and retrieving conditions of the human-understandable knowledge to again perform the retrieval (N in S78 shown in FIG. 7).

The processes in steps S72, S73 and S76 need not always be performed in response to a notification from the computer-understandable knowledge base group 1. For example, as for setting of the presenting conditions in step S72, default conditions may be set such that the user is permitted to change them at an arbitrary moment.

The retrieving, presenting and registering processes which are performed by the human-understandable knowledge base 2 will now be described with reference to FIG. 8.

Figure 8:
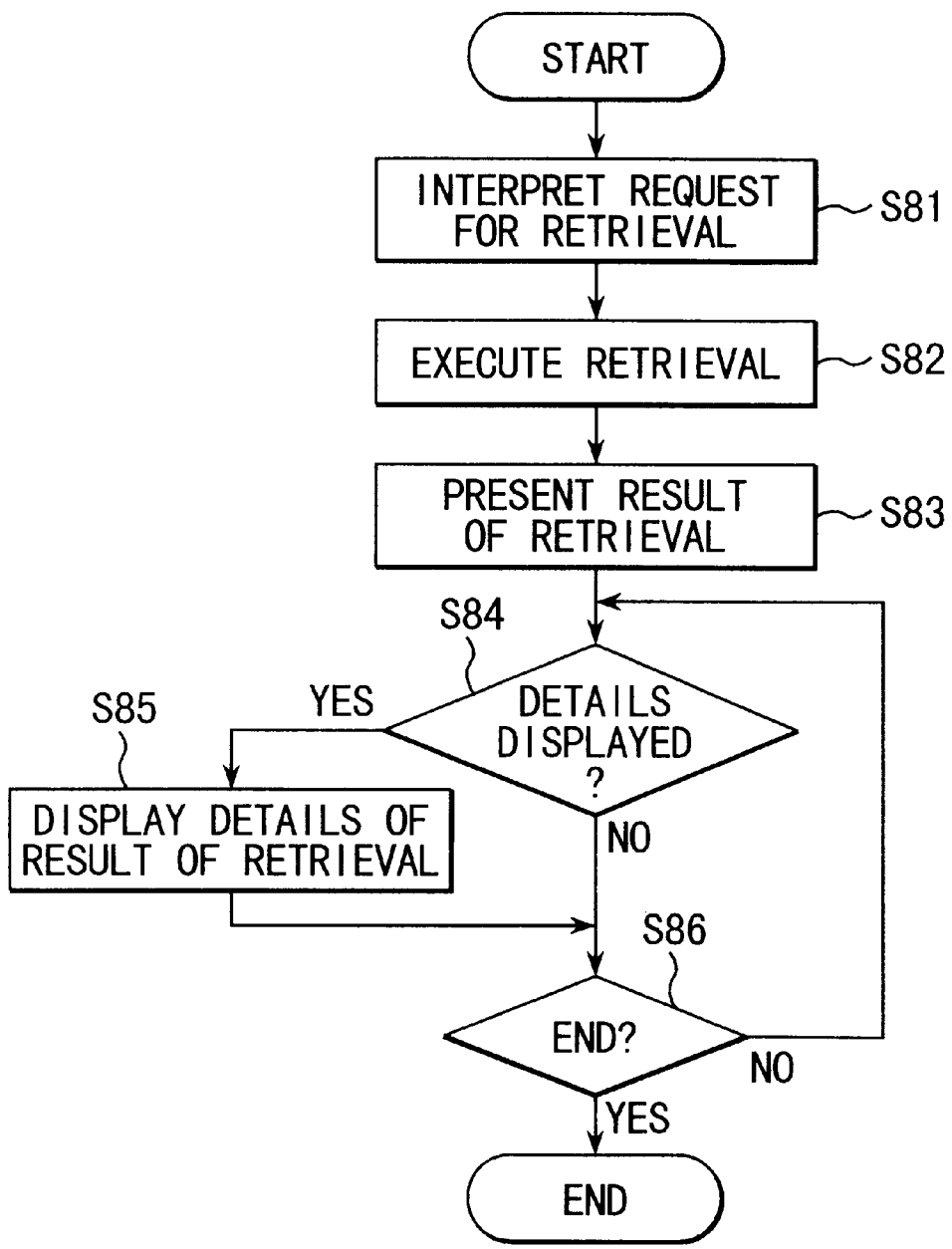
FIG. 8 is a flow chart of a human-understandable knowledge retrieving and presentation process performed by the human-understandable knowledge base according to this embodiment.
Figure 14C:
Figure 14D:

The retrieving portion 23 of the human-understandable knowledge base 2 interprets the request for retrieval issued from the control unit 3 and extracts the retrieving conditions (S81 shown in FIG. 8) in order to execute the retrieval in accordance with the extracted retrieving conditions (S82 shown in FIG. 8). Then, human-understandable knowledge retrieved through the human-understandable knowledge management portion 22 is presented to the user 4 (S83 shown in FIG. 8). FIGS. 14A to 14D show examples of interface screens for presenting a list of retrieved knowledge items to the user 4. In this case, a list of retrieved human-understandable knowledge items "title", "written by" and "day of registration", is displayed. When the user 4 needs to display details of the human-understandable knowledge selected on the foregoing interface (Y in S84 shown in FIG. 8), an interface for displaying details of each item of know-how knowledge as shown in FIG. 15 is presented to the user 4 (S85 shown in FIG. 8). If change is required, it is modified and update is required (151 shown in FIG. 15). Finally, an end requirement on the interface shown in FIG. 14 is made (Y in S86 shown in FIG. 8) so that the process may be completed.

A reference number 141 shown in FIG. 14A shows an example of human-understandable knowledge retrieved in accordance with the following notification sentences notified from the task procedure generating system which is one of the computer-understandable knowledge bases 1:

"constraint cannot be satisfied: 0, request for estimation, deadline"

"constraint cannot be satisfied: 0, approval of request for estimation, deadline"

"constraint cannot be satisfied: 0, estimation, deadline"

A reference number 142 shown in FIG. 14B indicates an example of human-understandable knowledge retrieved in accordance with the following notification sentence notified from the computer-understandable knowledge base 1:

"inference cannot be performed: 5, sub-task of purchase, price, classification of product"

The foregoing notification sentence is an example of a notification sentence which is notified in the case shown in 102 of FIG. 10, in which an input parameter has been set and the inference cannot be performed. The user 4 can solve a problem by referring to human-understandable knowledge which is semi-automatically retrieved in an incomplete case where the solution obtained as a result of the process performed by the computer-understandable knowledge base 1 cannot satisfy the constraint or no solution can be obtained. Specifically, even if the task "purchase" cannot be performed until the required delivery date, human-understandable knowledge can be obtained in that shortening of the task "estimation" enables the problem to be solved.

Hitherto, using the conventional expert system and computer-understandable knowledge base, it was usually impossible to attain a countermeasure if the system could not solve the problem. In contrast, the present invention is able to overcome the foregoing problem by complementarily combining the computer-understandable knowledge base and the human-understandable knowledge base.

A reference number 143 shown in FIG. 14C indicates an example of presentation of retrieval of related human-understandable knowledge by generating retrieving conditions in accordance with the fact that the "complexity" of the notification sentence notified from the computer-understandable knowledge base 1 is "0" or more, that is, all of "applied knowledge":

"applied knowledge: 5, purchase, sub-task, price, classification of product"

"applied knowledge: 0, request for estimation, deadline"

"applied knowledge: 2, request for arrangement, document, price"

"applied knowledge: 3, decision, person in charge, price"..............................................

"applied knowledge: 0, order, deadline"

A reference number 144 shown in FIG. 14D indicates an example of presentation of retrieval of related human-understandable knowledge by generating retrieving conditions in accordance with "applied knowledge" of the notification sentence notified from the computer-understandable knowledge base 1 having "complexity" of "2" or more:

"applied knowledge: 5, purchase, sub-task, price, classification of product"

"applied knowledge: 2, request for arrangement, price:

"applied knowledge: 3, decision, person in charge, price"

As described above, the user 4 can select human-understandable knowledge relating to the computer-understandable knowledge, which is an essential portion in the inference process, by setting the conditions for selecting the serviceability. FIG. 15 shows an example of the detailed display of the human-understandable knowledge. Referring to FIG. 15, human-understandable knowledge "procedure for purchasing an article, the price of which exceeds 100,000 yen" indicated in 51 shown in FIG. 5A is automatically retrieved in accordance with the retrieving conditions generated from the notification sentence supplied from the computer-understandable knowledge base 1, and the human-understandable knowledge is presented to the user 4.

In this example, human-understandable knowledge relating to the computer-understandable knowledge applied by the computer-understandable knowledge base 1 during the inference process is automatically presented. When the user 4 refers to the presented human-understandable knowledge, the user 4 can detect the basis of the inference. It is preferable for the user 4 that human-understandable knowledge in a form which can easily be understood by humans, rather than direct presentation of computer-understandable knowledge (for example 31 shown in FIG. 3A), is applied during the inference process.

If the contents of the presented human-understandable knowledge has an error or the contents are changed from the registered contents, the user 4 can arbitrarily modify the contents and issue a requirement for update (151 shown in FIG. 15) so that the contents stored in the human-understandable knowledge storage portion 24 may be updated. If the updated contents are used as new human-understandable knowledge, a requirement for registration (152 shown in FIG. 15) is made so that the new contents may be registered as new human-understandable knowledge in the human-understandable knowledge storage portion 24.

Although this embodiment has illustrated retrieval, presentation and updating the text of human-understandable knowledge, the present invention is not limited to this. For example, a file storing human-understandable knowledge expressed by an image or a figure and formed to be understandable by humans is made in advance so as to be set as the contents of the human-understandable knowledge. 153 shown in FIG. 15 corresponds to the name of a file storing human-understandable knowledge. When the file name is selected for presentation, the human-understandable knowledge management portion 22 turns on a relative tool in accordance with the extender provided for the file name to present the contents stored in the file.

The present invention has the structure such that human-understandable knowledge, which can easily be understood by humans and is related to the computer-understandable knowledge, is semi-automatically retrieved and presented. Thus, the inference process using the computer-understandable knowledge is given an additional value. Thus, problem solving support most suitable for humans can be provided.

Figure 16:
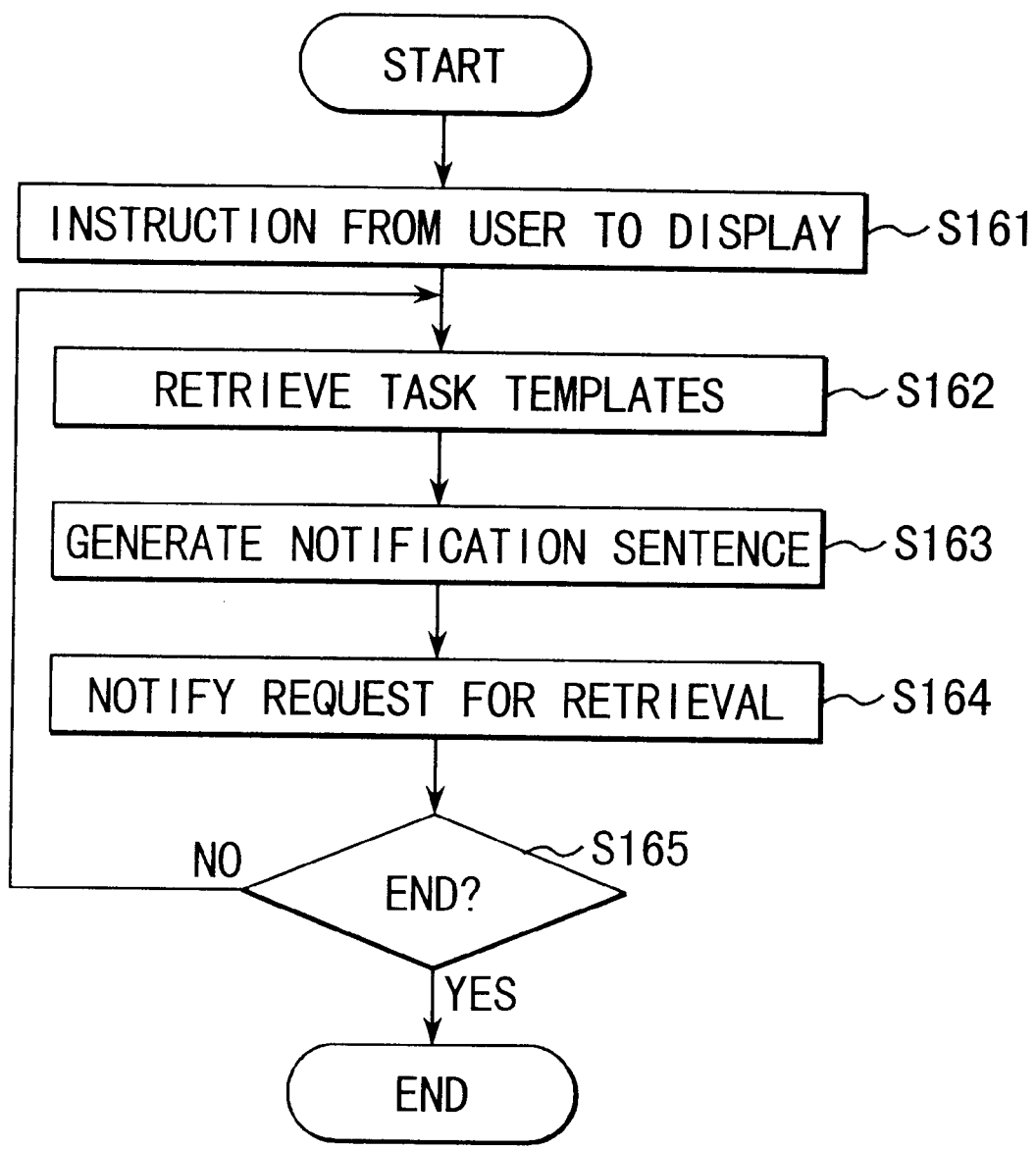
FIG. 16 is a flow chart of a process for simultaneously presenting computer-understandable knowledge of the computer-understandable knowledge base and know-how knowledge according to this embodiment.

Referring to FIG. 16, a procedure of a process for presenting computer-understandable knowledge and relative know-how knowledge in a form which can be understood by humans following an instruction from the user 4, will now be described.

When presentation of computer-understandable knowledge is required by the user 4 (S161 shown in FIG. 16), an input screen for instructing a task template shown in FIG. 9 is presented. Then, the user 4 inputs the name of the task template and instructs execution. The computer-understandable knowledge management portion 12 of the computer-understandable knowledge base 1 retrieves a task template corresponding to the input name of the task in the computer-understandable knowledge storage portion 14 to present a result of the retrieval to the user 4 (S162 shown in FIG. 16).

Then, when the name of the attribute of the task template is selected and presentation of know-how is required, the computer-understandable knowledge management portion 12 makes a notification sentence for retrieving human-understandable knowledge relating to the attribute (S163 shown in FIG. 16) and notifies it to the control unit 3 (S164 shown in FIG. 16). In the control unit 3 which has received the notification sentence, the human-understandable knowledge retrieving condition generating portion 34 generates a request for retrieval of human-understandable knowledge and notifies it to the human-understandable knowledge base 2. In the human-understandable knowledge base 2, know-how knowledge relating to the request is retrieved and presented. The foregoing process is repeated until end instruction is made (Y in S165 shown in FIG. 16).

An example of display of the task template in a case where "request for arrangement" has been input on the screen shown in FIG. 9 is shown in FIG. 17. When the attribute (171 shown in FIG. 17) "document" is selected and display of human-understandable knowledge (172 shown in FIG. 17) is instructed, the computer-understandable knowledge management portion 12 interprets the described computer-understandable knowledge for inferring a required "document" and generates a notification sentence to notify the same to the control unit 3. The process following the generation of the notification sentence and notification to the control unit 3 is similar to the process of presenting human-understandable knowledge relating to the knowledge applied in the inference process for solving the problem. If "document" is selected, the following notification sentence is generated:

"applied knowledge: 2, request for arrangement, document, price"

The notification sentence is notified to the human-understandable knowledge base 2 through the control unit 3. In the human-understandable knowledge base 2, "procedure for purchasing an article, the price of which is 100,000 yen or higher" is retrieved as the relative human-understandable knowledge. Thus, a retrieving screen shown in FIG. 15 is presented to the user 4.

Since the human-understandable knowledge is required to be in the form understandable by humans, human-understandable knowledge has been accumulated as texts, figures and images. Therefore, human-understandable knowledge can easily be described and accumulated as the human-understandable knowledge base 2. On the other hand, there is a possibility of error. By simultaneously presenting the human-understandable knowledge together with the computer-understandable knowledge, the validity of the relative human-understandable knowledge can be confirmed. If an error is included, the user can arbitrarily modify the contents. By simultaneously presenting the knowledge described in the computer-understandable knowledge and the human-understandable knowledge, the computer-understandable knowledge can easily be understood and they can complementarily be used.

In addition to presentation of existing human-understandable knowledge, the user can register new human-understandable knowledge while making it relate to the knowledge of the computer-understandable knowledge base or a result of a process for solving the problem. When human-understandable knowledge relating to the "deadline" is required to be newly registered during display of the task template of the "request for arrangement", shown in FIG. 17, the user selects "deadline" 173 of the "request for arrangement" to instruct know-how display 172. In this case, the following notification sentence is generated similarly to the foregoing process:

"applied knowledge: 0, request for arrangement, deadline"

Then, retrieval of corresponding human-understandable knowledge is executed. If corresponding human-understandable knowledge exists, this fact is notified to the user. An example of a screen employed at this time is shown in FIG. 18A. If human-understandable knowledge relating to the foregoing case is required to be newly registered, the user instructs human-understandable knowledge new registration 181. Thus, a screen (see FIG. 18B) for registering know-how is displayed. Since the user, in this case, requires registration of human-understandable knowledge relating to the "deadline: of the "request for arrangement", that is, human-understandable knowledge which has been attempted to be retrieved and which does not exist, words "request for arrangement" and "deadline" are automatically set to the keyword 185 of the human-understandable knowledge which is newly registered, as shown in FIG. 18B. Moreover, user "H" is automatically set to the writer 183 of the human-understandable knowledge, while date of input is automatically set to the registration date 184. Therefore, the user is required to simply input the title 182 and the contents 186 of the human-understandable knowledge required to be newly registered, change/add the keyword if necessary and set the file 187. Thus, new human-understandable knowledge can easily be registered.

The knowledge in the computer-understandable knowledge base is not always correct. In the foregoing case, lack of knowledge relating to the "deadline", that is, lacking of the following knowledge (human-understandable knowledge contents 186 shown in FIG. 18B): "set deadline for request for arrangement except days after 25th day of the month" sometimes results in the task procedure inferred by the computer-understandable knowledge base being incorrect. However, making and modifying of the computer-understandable knowledge base cannot be performed by a usual user and be performed by a person who has made the knowledge base. Therefore, even if the user detects an error or omission, the user cannot correct it. In this case, this embodiment allows the user to easily register new human-understandable knowledge for supplementing the knowledge of the computer-understandable knowledge base to share the knowledge with all other users. On the other hand, the person, who made the knowledge base can arbitrarily add and modify knowledge the computer-understandable knowledge base referring to the human-understandable knowledge registered by the usual user. Although the development of the knowledge base has been performed by interviewing an expert, the present invention enables the quantity and quality of the knowledge base to be gradually improved in accordance with human-understandable knowledge registered by the usual user and shared by a multiplicity of users while using the knowledge base.

Figure 19:
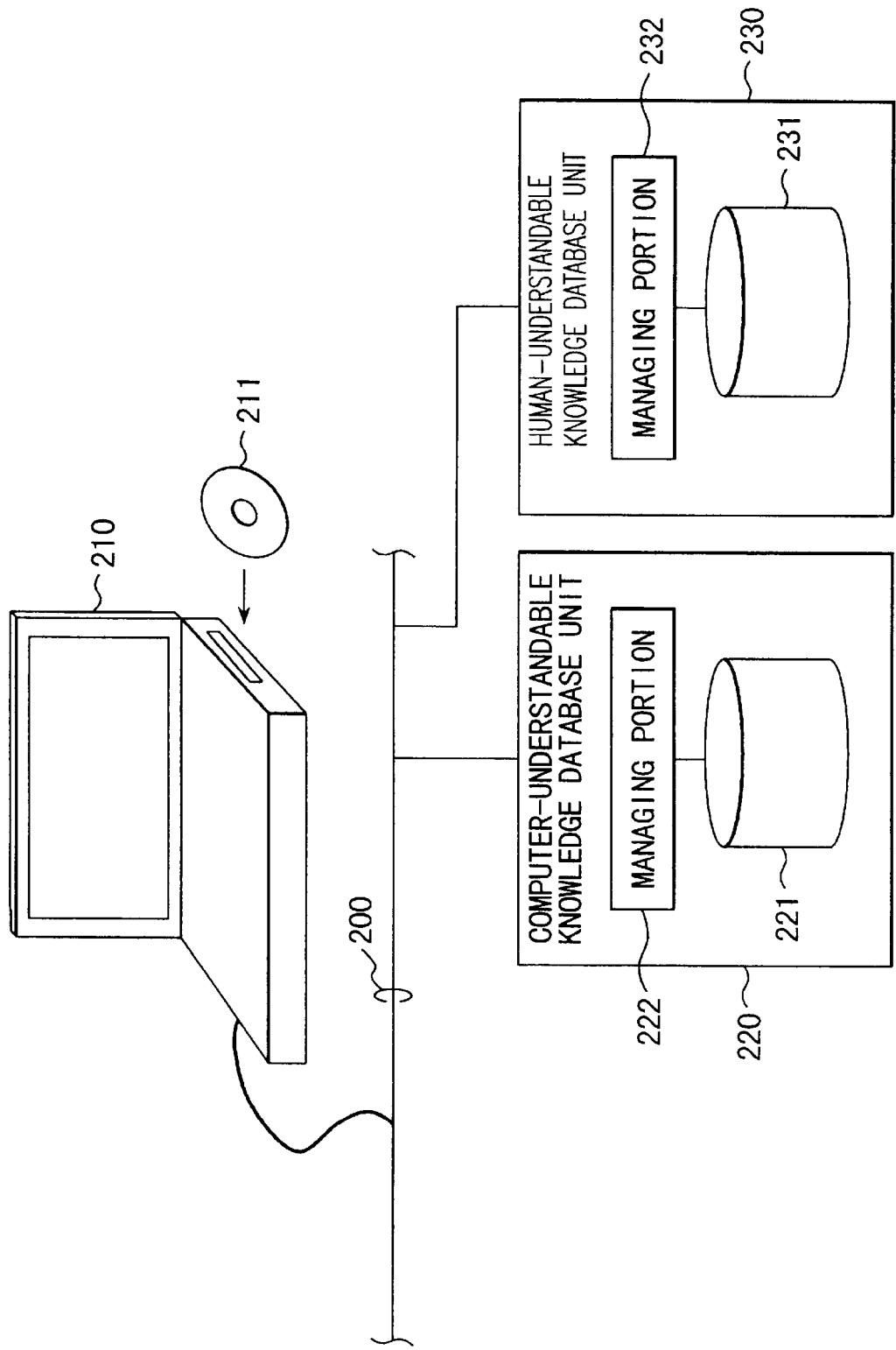
FIG. 19 is a diagram showing an example of the structure in which the foregoing embodiment is realized on a network.

The present invention can be realized by, for example, a personal computer 210 connected to a network 200 as shown in FIG. 19.

The network 200 may be formed by a communication line for the Internet or a LAN. The personal computer 210 is a desk top or a lap-top computer and arranged to be operated in accordance with a program stored in a storage medium, such as a CD-ROM 211. The personal computer 210 can access to the network 200 through a modem (not shown) or the like.

A computer-understandable knowledge base unit 220 corresponding to the computer-understandable knowledge base 1 shown in FIG. 1 and a human-understandable knowledge base unit 230 corresponding to the human-understandable knowledge base 2 are connected to the network 200. The computer-understandable knowledge base unit 220 is provided with a data base 221 for storing computer-understandable knowledge and a management portion 222 for managing data communication between the data base 221 and the network 200. Similarly, the human-understandable knowledge base unit 230 is provided with a data base 231 for storing human-understandable knowledge and a management portion 232 for managing data communication between the data base 231 and the network 200.

In the system shown in FIG. 19, communication between the control unit 3 and the knowledge bases 1 and 2 shown in FIG. 1 is performed through the network 200 so that an effect similar to that in the foregoing embodiment can be obtained. The user operates the foregoing system such that the storage medium 211 storing a predetermined program set in the computer 210 to control the computer 210 operating in accordance with the program. Thus, an effect similar to that in the foregoing embodiment can be obtained.

Figure 20:
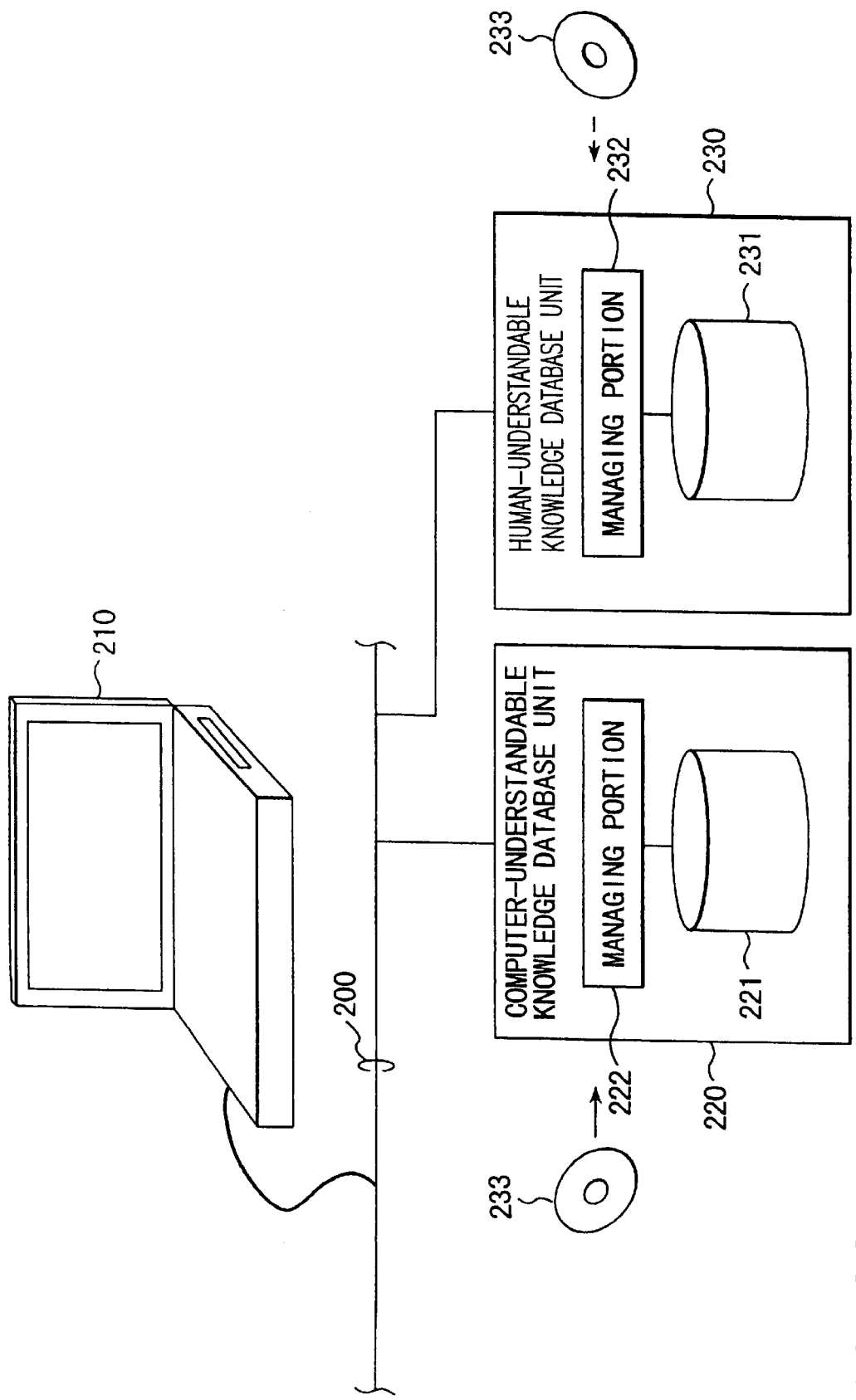
FIG. 20 is a diagram showing an example of the structure in which the foregoing embodiment is realized on a network.

The necessity that the predetermined program is operated in the computer 210 as a terminal as shown in FIG. 19, can be omitted. For example, as shown in FIG. 20, a storage medium 223 or 233 storing a predetermined program is mounted on the computer-understandable knowledge base unit 220 or human-understandable knowledge base unit 230 to operate the system in accordance with the program. In this case, an effect similar to that in the foregoing embodiment can be obtained.

The computer 210 shown in FIG. 20 is only required to access the network 200.

As a matter of course, somewhat different programs are stored in the storage mediums 211, 223 and 233 to realize corresponding processes.

As described above, according to the present invention, the user can refer to human-understandable knowledge relating to the problem to be solved among human-understandable knowledge accumulated in a variety of viewpoints, purposes and forms, in such a manner that the reference is made to relate to the process for solving the problem by the computer-understandable knowledge base and the solution. Since the conditions for retrieving the human-understandable knowledge are automatically generated in accordance with the problem solving process and the result of the process in the computer-understandable knowledge base, the user is not required to set the retrieving conditions for retrieving the related human-understandable knowledge.

Even if solution of the problem by the computer-understandable knowledge base is impossible or incomplete, the user can refer to the human-understandable knowledge relating to the problem. Hitherto, a conventional computer-understandable knowledge base and expert system could not obtain any countermeasure or guide if the problem solving process failed or the obtained solution was incomplete. In that case, the user had to ask an expert for a solving method or had to retrieve and refer to the human-understandable knowledge. However, the present invention can lighten the foregoing labors to improve problem solving efficiency.

Since the structure according to the present invention is arranged such that the human-understandable knowledge base and the computer-understandable knowledge base are independent from each other and they can be individually used. Moreover, a human-understandable knowledge base can be shared to supplement a plurality of computer-understandable knowledge bases in order to solve problems. Therefore, the necessity of preparing a plurality of human-understandable knowledge bases to correspond to the computer-understandable knowledge bases can be eliminated. Thus, the operation for accumulating and managing human-understandable knowledge in the human-understandable knowledge base can be reduced.

If a setting portion for setting the conditions for presenting the human-understandable knowledge to the user is provided, the user can precisely set the condition of whether or not the human-understandable knowledge is presented in relation to the state of the problem solving process and a result of the process. Specifically, setting can be performed such that only when a problem cannot be solved by the computer-understandable knowledge base, the human-understandable knowledge is presented. Another setting can be performed such that human-understandable knowledge relating to all the computer-understandable knowledge which has been used by the computer-understandable knowledge base to solve the problem is presented.

By using the setting portion for setting the conditions for selecting human-understandable knowledge, human-understandable knowledge serviceable in solving the problem can easily be selected from human-understandable knowledge relating to the computer-understandable knowledge applied to the inference process.

The conditions for retrieving the human-understandable knowledge are automatically generated. The user can arbitrarily modify the automatically generated retrieving conditions. As a result, the user can flexibly perform an interactive operation such that human-understandable knowledge may be retrieved under a certain retrieving condition and the limitation of the retrieving condition may be intensified or moderated in accordance with the result of the retrieval in order to again perform the retrieval.

Since human-understandable knowledge accumulated in the human-understandable knowledge base is accumulated without limitations of format, meaning and classification, it is difficult to retrieve only required human-understandable knowledge from the large volume of human-understandable knowledge. By using the means for the user to set the conditions for presenting the human-understandable knowledge, the user can efficiently retrieve and refer to the human-understandable knowledge required to solve the problem.

By simultaneously presenting and using complementarily computer-understandable knowledge and human-understandable knowledge which can easily be understood by humans, the validity of the human-understandable knowledge can be confirmed. Moreover, the computer-understandable knowledge, which cannot easily be understood by humans, can easily be understood.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:
   a first knowledge base, including a first computer readable medium for storing information representing human-understandable knowledge;
   second knowledge base, independently provided from the first knowledge base, the second knowledge base including a second computer readable medium for storing information representing computer-understandable knowledge;
   a first inference device, included in the second knowledge base, for generating a first result indication of a first problem by using the information representing computer-understandable knowledge stored in the second computer readable medium;
   a control device, including
      a solution interpreting portion for interpreting the first result generated by the first inference device, and
      a retrieving condition generating portion for generating at least one of a retrieving condition and criteria for retrieving the information representing human understandable knowledge related to the first result; and
   a retrieval device, included in the first knowledge base, for retrieving information representing human-understandable knowledge related to the first result from the first computer readable medium in accordance with the at least one of a retrieving condition and criteria generated by the retrieving condition generating portion, wherein
   said human-understandable knowledge includes at least one of a text, a figure, a sketch, on-line pen input, pointing information, a table, an image, a moving picture, voice, sound and hyper text.

2. A computer system comprising:
   a first knowledge base, including a first computer readable medium for storing information representing human-understandable knowledge;
   a second knowledge base, independently provided from the first knowledge base, the second knowledge base including a second computer readable medium for storing information representing computer-understandable knowledge;
   a first inference device, included in the second knowledge, for generating a first result indicating a first solution of a first problem by using the information representing computer-understandable knowledge stored in the second computer readable medium;
   a control device, including
      a solution interpreting portion for interpreting the first result generated by the first inference device, and
      a retrieving condition generating portion for generating at least one of a retrieving condition and criteria for retrieving the information representing human understandable knowledge related to the first result; and a retrieval device, included in the first knowledge base, for retrieving information representing human-understandable knowledge related to the first result from the first computer readable medium in accordance with the at least one of a retrieving condition and criteria generated by the retrieving condition generating portion, wherein said computer-understandable knowledge includes at least one of a formula, a logical formula, a rule, a frame and a semantic network.

3. A computer system comprising:

a first knowledge base, including a first computer readable medium for storing information representing human-understandable;

a second knowledge base, independently provided from the first knowledge base, the second knowledge base including a second computer readable medium for storing information representing computer-understandable knowledge;

a first inference device, included in the second knowledge base, for generating a first result indicating a first solution of a first problem by using the information representing computer-understandable knowledge stored in the second computer readable medium;

a control device, including
  a solution interpreting, portion for interpreting the first result generated by the first inference device, and
  a retrieving condition generating portion for generating at least one of a retrieving condition and criteria for retrieving the information representing human understandable knowledge related to the first result;

a retrieval device, included in the first knowledge base, for retrieving information representing human-understandable knowledge related to the first result from the first computer readable medium in accordance with the at least one of a retrieving condition and criteria generated by the retrieving condition generating portion; and means for at least one of registering, modifying, and deleting the information representing human-understandable knowledge stored in said first knowledge base at an arbitrary timing by at least one user.

4. A computer system comprising:

first knowledge base, including a first computer readable medium for storing information representing human-understandable knowledge;

a second knowledge base, independently provided from the first knowledge base, the second knowledge base including a second computer readable medium for storing information representing computer-understandable knowledge;

a first inference device, included in the second knowledge base, for generating a first result indicating a first solution of a first problem by using the information representing computer-understandable knowledge stored in the second computer readable medium;

a control device, including
  a solution interpreting portion for interpreting the first result generated by the first inference device, and
  a retrieving condition generating portion for generating at least one of a retrieving condition and criteria for retrieving the information representing human understandable knowledge related to the first result;

a retrieval device, included in the first knowledge base, for retrieving information representing human-understandable knowledge related to the first result from the first computer readable medium in accordance with the at least one of a retrieving condition and criteria generated by the retrieving condition generating portion; and means for simultaneously displaying
  a portion of the information representing computer-understandable knowledge which is related to the first problem and which is stored in said second knowledge base, and
  a portion of the human-understandable knowledge which is related to the portion of the information representing computer-understandable knowledge for assisting a user to understand the portion of the information representing computer-understandable knowledge.

5. A computer system comprising:

a first knowledge base, including a first computer readable medium for storing information representing human-understandable knowledge;

a second knowledge base, independently provided from the first knowledge base, the second knowledge base including a second computer readable medium for storing information representing computer-understandable knowledge;

a first inference device, included in the second knowledge base, for generating a first result indicating a first solution of a first problem by using the information representing computer-understandable knowledge stored in the second computer readable medium;

a control device, including
  a solution interpreting portion for interpreting the first result generated by the first inference device, and
  a retrieving condition generating portion for generating at least one of a retrieving condition and criteria for retrieving the information representing human understandable knowledge related to the first result;

a retrieval device, included in the first knowledge base, for retrieving information representing human-understandable knowledge related to the first result from the first computer readable medium in accordance with the at least one of a retrieving condition and criteria generated condition generating portion; and a plurality of knowledge bases, independently provided from the first knowledge base, each one of the plurality of knowledge bases including
  a third computer readable medium for storing computer-understandable knowledge and
  a second inference device, included in the each one of the plurality of knowledge bases, for generating a second result indicating a second solution of a second problem by using the information representing computer-understandable knowledge stored in the third computer readable medium.

6. A computer system comprising:

a first knowledge base, including a first computer readable medium for storing information representing human-understandable knowledge;

a second knowledge base, independently provided from the first knowledge base, the second knowledge base including a second computer readable medium for storing information representing computer-understandable knowledge;

a first inference device, included in the second knowledge base, for generating a first result indicating a first solution of a first problem by using the information representing computer-understandable knowledge stored in the second computer readable medium;

a control device, including
- a solution interpreting portion for interpreting the first result generated by the first inference device, and
- a retrieving condition generating portion for generating at least one of a retrieving condition and criteria for retrieving the information representing human understandable knowledge related to the first result; and a retrieving device, included in the first knowledge base, for retrieving information representing human-understandable knowledge related to the first result from the first computer readable medium in accordance with the at least one of a retrieving condition and criteria generated by the retrieving condition generating portion, wherein said retrieval device retrieves information representing human-understandable knowledge related to the first result from the first knowledge base, when the first result indicates at least one of
- failure by the first inference device to generate a first solution of the first problem and
- an incomplete first solution of the first problem is generated by the first inference device.

7. A computer system comprising:

a first knowledge base, including a first computer readable medium for storing information representing human-understandable knowledge;

a second knowledge base, independently provided from the first knowledge base, the second knowledge base including a second computer readable medium for storing information representing computer-understandable knowledge;

a first inference device, included in the second knowledge base, for generating a first result indicating a first solution of a first problem by using the information representing computer-understandable knowledge stored in the second computer readable medium;

a control device, including
- a solution interpreting portion for interpreting the first result generated by the first inference device, and
- a retrieving condition generating portion for generating at least one of a retrieving condition and criteria for retrieving the information representing human understandable knowledge related to the first result; and a retrieval device, included in the first knowledge base, for retrieving information representing human-understandable knowledge related to the first result from the first computer readable medium in accordance with the at least one of a retrieving condition and criteria generated by the retrieving condition generating portion, wherein said retrieval device retrieves, from the first computer readable medium, information representing human-understandable knowledge corresponding to a portion of the information representing computer-understandable knowledge related to the first problem, wherein the portion of the information representing computer-understandable knowledge related to the first problem has been used by the first inference device when an incomplete first solution of the first problem is generated by the first inference device.

8. A method for implementation by a computer system, the method comprising the steps of:

generating a solution of a problem in a first knowledge base by using computer-understandable knowledge stored in a first computer readable medium included in the first knowledge base; and retrieving, beyond knowledge base from a second computer readable medium included in the second knowledge base, human-understandable knowledge in accordance with the solution of the problem generated by the step of generating, a solution, wherein the first knowledge base and the second knowledge base operate independently, and wherein
- said step of retrieving retrieves human-understandable knowledge related to the problem from the second computer readable medium, when one of
  - the step of generating fails to generate a solution of the problem and
  - the step of generating generates an incomplete solution of the problem.

9. A method for implementation by a computer system, the method comprising the steps of:

generating a solution of a problem in a first knowledge base by using computer-understandable knowledge stored in a first computer readable medium included in the first knowledge base; and retrieving, by a second knowledge base from a second computer readable medium included in the second knowledge base, human-understandable knowledge in accordance with the solution of the problem generated by the step of generating a solution, wherein the first knowledge base and the second knowledge base operate independently, a wherein
- said step of retrieving comprises,
  - retrieving, by the second knowledge base from the second knowledge base, a portion of the human-understandable knowledge related to an incomplete solution of the problem when the step of generating generates the incomplete solution of the problem.

10. A computer program product including a computer readable medium embodying a plurality of program instructions for execution on a computer system, which, when executed, cause the computer system to perform the steps of:

generating a solution of a problem in a first knowledge base by using computer-understandable knowledge stored in the first knowledge base;

retrieving, by a second knowledge base from the second knowledge base, human-understandable knowledge in accordance with the solution of the problem generated by the first knowledge base, wherein the first knowledge base and the second knowledge base operate independently; and retrieving, by the second knowledge base from the second knowledge base, human-understandable knowledge related to the problem when one of
- the step of generating fails to generate a solution of the problem and
- the step of generating generates an incomplete solution of the problem.

11. A computer program product including a computer readable medium embodying a plurality of program instructions for execution on a computer system, which, when executed, cause the computer system to perform the steps of:

generating a solution of a problem in a first knowledge base by using computer-understandable knowledge stored in the first knowledge base; and retrieving, by a second knowledge base from the second knowledge base, human-understandable knowledge in accordance with the solution of the problem generated by the first knowledge base, wherein the first knowledge base and the second knowledge base operate independently, and wherein the step of retrieving comprises retrieving, by the second knowledge base from the second knowledge base, a portion of the human-understandable knowledge related to an incomplete solution of the problem when the step of generating generates the incomplete solution of the problem.

12. A computer system comprising, a first knowledge base, including a first computer readable medium for storing information representing human-understandable knowledge;

a second knowledge base, independently provided from the first knowledge base, the second knowledge including a second computer readable medium for storing information representing computer-understandable knowledge;

a first inference device, included in the second knowledge base, for generating a first result indicating a first solution of a first problem by using the information representing computer-understandable knowledge stored in the second computer readable medium;

a control device, including
   a solution interpreting portion for interpreting the first result generated by the first inference device, and
   a retrieving condition generating portion for generating at least one of a retrieving condition and criteria for retrieving the information representing human understandable knowledge related to the first result; and a retrieval device, included in the first knowledge base, for retrieving information representing human-understandable knowledge related to the first result from the first computer readable medium in accordance with the at least one of a retrieving condition and criteria generated by the retrieving condition generating portion, wherein
   the first result indicates at least one of a complete first solution of the first problem, a failure to generate a first solution of the first problem, and an incomplete first solution of the first problem.

13. A computer system comprising:

a first knowledge base, including a first computer readable medium for storing information representing human-understandable knowledge;

a second knowledge base, independently provided from the first knowledge base, the second knowledge base including a second computer readable medium for storing information representing computer-understandable knowledge;

a first inference device, included in the second knowledge base, for generating a first result indicating a first solution of a first problem by using the information representing computer-understandable knowledge stored in the second computer readable medium;

a control device, including
   a solution interpreting portion for interpreting the first result generated by the first inference device, and
   a retrieving condition generating portion for generating at least one of a retrieving condition and criteria for retrieving the information representing human understandable knowledge related to the first result; and a retrieval device, included in the first knowledge base, for retrieving information representing human-understandable knowledge related to the first result from the first computer readable medium in accordance with the at least one of a retrieving condition and criteria generated by the retrieving condition generating portion, wherein
   the first knowledge base includes a first management portion for managing the information representing human-understandable knowledge, and
   the second knowledge base includes a second management portion for managing the information representing computer-understandable knowledge.

14. A computer system comprising:

a first knowledge base, including a first computer readable medium for storing information representing human-understandable knowledge;

a second knowledge base, independently provided from the first knowledge base, the second knowledge base including a second computer readable medium for storing information representing computer-understandable knowledge;

a first inference device, included in the second knowledge base, for generating a first result indicating a first solution of a first problem by using the information representing computer-understandable knowledge stored in the second computer readable medium;

a control device, including
   a solution interpreting portion for interpreting the first result generated by the first inference device, and
   a retrieving condition generating portion for generating at least one of a retrieving condition and criteria for retrieving the information representing human understandable knowledge related to the first result; and a retrieval device, included in the first knowledge base, for retrieving information representing human-understandable knowledge related to the first result from the first computer readable medium in accordance with the at least one of a retrieving condition and criteria generated by the retrieving condition generating portion, wherein
   the first knowledge base includes a first user interface, and
   the second knowledge base includes a second user interface.

15. A computer system comprising:

a first knowledge base, including a first computer readable medium for storing information representing human-understandable knowledge;

a second knowledge base, independently provided from the first knowledge base, the second knowledge base including a second computer readable medium for storing information representing computer-understandable knowledge;

a first inference device, included in the second knowledge base, for generating a first result indicating a first solution of a first problem by using the information representing computer-understandable knowledge stored in the second computer readable medium;

a control device, including
   a solution interpreting portion for interpreting the first result generated by the first inference device, and
   a retrieving condition generating portion for generating at least one of a retrieving condition and criteria for retrieving the information representing human understandable knowledge related to the first result; and a retrieval in the first knowledge base, for retrieving information representing human-understandable knowledge related to the first result from the first computer readable medium in accordance with the at least one of a retrieving condition and criteria the retrieving condition generating portion, wherein the second knowledge base includes a management portion for at least one of registering, modifying, and deleting the information representing computer-understandable knowledge stored in the second computer readable medium at an arbitrary timing by at least one user.

16. A computer system comprising:

a first knowledge base, including a first computer readable medium for storing information representing human-understandable knowledge;

a second knowledge base, independently provided from the first knowledge base, the second knowledge base including a second computer readable medium for storing information representing computer-understandable knowledge;

a first inference device, included in the second knowledge base, for generating a first result indicating a first solution of a first problem by using the information representing computer-understandable knowledge stored in the second computer readable medium;

a control device, including
  a solution interpreting portion for interpreting the first result generated by the first inference device, and
  a retrieving condition generating portion for generating at least one of a retrieving condition and criteria for retrieving the information representing human understandable knowledge related to the first result; and a retrieval device, included in the first knowledge base, for retrieving information representing human-understandable knowledge related to the first result from the first computer readable medium in accordance with the at least one of a retrieving condition and criteria generated by the retrieving condition generating portion, wherein the control means communicates with the first knowledge base and the second knowledge base through a network.

17. A computer system comprising:

a first knowledge base, including a first computer readable medium for storing information representing human-understandable knowledge;

a second knowledge base, independently provided from the first knowledge base, the second knowledge base including a second computer readable, medium for storing information representing computer-understandable knowledge;

a first inference device, included in the second knowledge base, for generating a first result indicating a first solution of a first problem by using the information representing computer-understandable knowledge stored in the second computer readable medium;

a control device, including
  a solution interpreting portion for interpreting the first result generated by the first inference device, and
  a retrieving condition generating portion for generating at least one of a retrieving condition and criteria for retrieving the information representing human understandable knowledge related to the first result;

a retrieval device, included in the first knowledge base, for retrieving information computer readable medium in accordance with the at least one of a retrieving condition and criteria generated by the retrieving condition generating portion;

a user interface, included in the second knowledge base, for inputting, from a user, information indicating an identification of the first problem; and a management portion, included in the second knowledge base, for selecting a task template corresponding to the information indicating the identification of the first problem.

18. A method for implementation by a computer system, the method comprising the steps of:

generating a solution of a problem in a first knowledge base by using computer-understandable knowledge stored in a first computer readable medium included in the first knowledge base;

retrieving, by a second knowledge from a second computer readable medium included in the second knowledge base, human-understandable knowledge in accordance with the solution of the problem generated by the step of generating a solution, wherein the first knowledge base and the second knowledge base operate independently;

inputting, by a user interface included in the first knowledge base, from a user, information indicating an identification of the problem; and selecting, by a management portion included in the first knowledge base, a task template corresponding to the information indicating the identification of the problem.

* * * * *